United States Patent
Seymour et al.

(10) Patent No.: US 11,699,186 B1
(45) Date of Patent: *Jul. 11, 2023

(54) SYSTEMS AND METHODS FOR IT SUPPLY CHAIN MANAGEMENT ON A DISTRIBUTED PLATFORM

(71) Applicant: EDJX, INC., Raleigh, NC (US)

(72) Inventors: Delano Seymour, St George's (BM); Douglas Steele, Grand Cayman (KY); John Cowan, Raleigh, NC (US)

(73) Assignee: EDJX, INC., Raleigh, NC (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/226,689

(22) Filed: Apr. 9, 2021

Related U.S. Application Data

(63) Continuation of application No. 16/455,135, filed on Jun. 27, 2019, now Pat. No. 10,984,474.

(60) Provisional application No. 62/691,326, filed on Jun. 28, 2018.

(51) Int. Cl.
*G06Q 40/04* (2012.01)
*G06Q 20/38* (2012.01)
*G06Q 20/06* (2012.01)
*H04L 47/283* (2022.01)

(52) U.S. Cl.
CPC .......... *G06Q 40/04* (2013.01); *G06Q 20/389* (2013.01); *H04L 47/283* (2013.01); *G06Q 20/0658* (2013.01); *G06Q 2220/00* (2013.01)

(58) Field of Classification Search
CPC .. G06Q 40/04; G06Q 20/389; G06Q 20/0658; G06Q 2220/00; H04L 47/283
USPC .......................................................... 705/37
See application file for complete search history.

(56) References Cited

U.S. PATENT DOCUMENTS

| | | | |
|---|---|---|---|
| 8,756,302 B2 * | 6/2014 | Cowan | H04L 43/022 709/223 |
| 9,336,061 B2 | 5/2016 | Beaty et al. | |
| 10,303,576 B1 | 5/2019 | Seymour et al. | |
| 2001/0051913 A1 * | 12/2001 | Vashistha | G06Q 40/04 705/37 |
| 2010/0332262 A1 | 12/2010 | Horvitz et al. | |
| 2013/0332303 A1 * | 12/2013 | Schank | H04L 43/0817 705/26.4 |
| 2015/0348169 A1 * | 12/2015 | Harris | G06Q 30/0633 705/26.8 |
| 2015/0371244 A1 | 12/2015 | Neuse et al. | |

OTHER PUBLICATIONS

ConsenSys, Scaling Consensus for Enterprise: Explaining the IBFT Algorithm, Jun. 22, 2018 (Year: 2018).*

* cited by examiner

*Primary Examiner* — Clifford B Madamba
(74) *Attorney, Agent, or Firm* — Neo IP

(57) ABSTRACT

Systems and methods for buying, selling, and financing enterprise IT infrastructure capacity on a decentralized and distributed marketplace platform are disclosed. In one embodiment, the decentralized and distributed IT marketplace platform is based on the blockchain technology. In one embodiment, a blockchain-based IT marketplace platform provides a decentralized supply chain for IT assets and financial services and establishes a self-regulating and trustless marketplace of connected consumers, producers, and financiers. In one embodiment, the blockchain-based IT marketplace platform enables developing, executing, financing and monetizing modern, cloud native, enterprise compute infrastructure and software applications.

20 Claims, 43 Drawing Sheets

Hardware Configuration and Workload Details

Hardware Infrastructure

| Infrastructure Configuration | |
|---|---|
| Servers | 60 |
| sockets (per Server) | 2 |
| Cores (per Socket) | 16 |
| CPU Speed (GHz) (per Core) | 3.000 |
| Memory (GiB) (per Server) | 384 |
| Storage (TiB) | 100 |
| SAN Bandwidth (GiB/s) | 10 |
| LAN Bandwidth (Gbps) | 10 |
| WAN Bandwidth (Mbps) | 100 |
| Allocation Constraints | |
| Desired Reserve Level | 25% |
| vCPUs (per Machine ratio) | 3.82 |
| Machines (per Core ratio) | 6.00 |
| Infrastructure Costs | |
| Amortization Period (Months) | 36 |
| Total Monthly Costs ($) | 100,000 |
| Additional Monthly Costs ($) | 3,000 |

Average Workload Usage per Hour

| Practical Workload | | Metrics |
|---|---|---|
| CPU | 500 | (MHz) |
| MEMORY | 8,096 | (MiB) |
| STORAGE | 30 | (GiB) |
| DISK IO | 1,000 | (KiB/s) |
| LAN IO | 1,000 | (Kbps) |
| WAN IO | 0 | (Kbps) |

Enter Total Machines & Hours

| Total Machines | Total Hours |
|---|---|
| 1,750 | 730 |

FIG. 3

| Dynamic Index System | | DIS TYPE | | |
|---|---|---|---|---|
| Weight | DIS Criteria Items | Premium | Standard | Basic |
| 100 | AVG WEIGHTED SCORE | 0.742 | 0.484 | 0.207 |
| 40 | Availability Score (AVLi) | 0.332 >94% | 0.200 >62% | 0.051 >28% |
| 30 | Capability Score (CAPi) | 0.246 >73% | 0.150 >46% | 0.039 >14% |
| 20 | Usage Score (USEi) | 0.166 >6% | 0.100 >2% | 0.026 >0% |
| 10 | Impact Score (IMPi) | 0.083 >40% | 0.050 >11% | 0.013 >0% |
| Weighted Score Range | | 0.890->0.650 | 0.610->0.360 | 0.310->0.130 |

FIG. 22

Dynamic Index System Table

| Percentile %> | (AVLD)-40 Hts | Score | (CAPD)-30 % | Score | (USED)-20 % | Score | (IMPD)-10 % | Score |
|---|---|---|---|---|---|---|---|---|
| 95% | 740 | 0.380 | 89% | 0.285 | 18% | 0.190 | 58% | 0.095 |
| 90% | 731 | 0.360 | 86% | 0.270 | 8% | 0.180 | 53% | 0.090 |
| 80% | 705 | 0.320 | 74% | 0.240 | 7% | 0.160 | 41% | 0.080 |
| 70% | 645 | 0.280 | 70% | 0.210 | 6% | 0.140 | 27% | 0.070 |
| 60% | 595 | 0.240 | 63% | 0.180 | 4% | 0.120 | 22% | 0.060 |
| 50% | 578 | 0.200 | 59% | 0.150 | 3% | 0.100 | 15% | 0.050 |
| 40% | 512 | 0.160 | 50% | 0.120 | 2% | 0.080 | 11% | 0.040 |
| 30% | 434 | 0.120 | 42% | 0.090 | 1% | 0.060 | 9% | 0.030 |
| 20% | 344 | 0.080 | 37% | 0.060 | 1% | 0.040 | 7% | 0.020 |
| 10% | 221 | 0.040 | 30% | 0.030 | 0% | 0.020 | 6% | 0.010 |
| 0% | 0 | 0.000 | 0% | 0.000 | 0% | 0.000 | 0% | 0.000 |

FIG. 23

| SELLER "A" SCORE TABLE | | Premium | Standard | Basic |
|---|---|---|---|---|
| Weight | DIS Criteria Items | 0.37 | 0.33 | 0 |
| 100 | WEIGHTED SCORE | 0.700 | | |
| 40 | Availability Score (AVLi) | 0.280 =94% | | |
| 30 | Capacity Score (CAPi) | | 0.210 =71% | |
| 20 | Usage Score (USEi) | | 0.120 =5.4% | |
| 10 | Impact Score (IMPi) | 0.090 =58% | | |

FIG. 24

| Seller "A" Score Card | 0.700 | |
|---|---|---|
| DIS Categories | Level | Score |
| Availability Score (AVLi) | P | 0.280 |
| Capacity Score (CAPi) | S | 0.210 |
| Usage Score (USEi) | P | 0.120 |
| Impact Score (IMPi) | S | 0.090 |

SYSTEMS AND METHODS FOR IT SUPPLY CHAIN MANAGEMENT ON A DISTRIBUTED PLATFORM

CROSS-REFERENCES TO RELATED APPLICATIONS

The present invention is related to and claims priority from the following U.S. patent documents: this application is a continuation of U.S. patent application Ser. No. 16/455,135, filed Jun. 27, 2019, which claims priority from U.S. Provisional Patent Application No. 62/691,326, filed Jun. 28, 2018. Each of the above listed applications is incorporated herein by reference in its entirety.

BACKGROUND OF THE INVENTION

1. Field of the Invention

This invention relates to systems and methods for IT supply chain management. More particularly, this invention relates to decentralized and distributed IT supply chain management.

2. Description of the Prior Art

Client/Server computing was disrupted by x86 virtualization technology pioneered by companies like VMware in the early 2000s. X86 virtualization held with it the promise of achieving legitimate server multi-tenancy. The notion was that IT administrators could spawn many logical servers on a single physical server, and thus yield much better resource utilization efficiency.

Online retail ecommerce giant Amazon.com saw a much bigger opportunity and more profound disruption in utility computing. Like most big IT operations of the era, Amazon understood the true cost of wasted compute capacity. They also understood better and before anyone else in the market that ease of access and back-end automation was important. They knew the real pain point in the market was experienced by the software developer saddled with burdensome company governance and centralized bureaucracies. They understood that old school overzealous administration was the real friction in modern internet innovation.

Amazon Web Services (AWS) started to deliver out-of-the-box scale using Amazon.com's massive surplus compute at a fraction of the cost as early as in 2002. Whatever AWS recovered was merely a bonus to the Amazon.com flagship, which left legacy IT venders perilously vulnerable, and provided the ability to create entirely disposable and risk-free data centers with the level of automation equivalent to credit card processing. In so doing, AWS touched off the cloud computing era.

While AWS and its nearest competitors at Microsoft and Google have defined a market they completely dominate, they still face challenges. First of all, it requires customers to "lock in" to a single service provider. According to industry research, more than 75% of enterprise IT buyers cite the fear of being locked in to one cloud vendor as an inhibiting factor to adoption. This will only increase as application code achieves portability and serverless computing becomes mainstream. Serverless computing is a model in which the cloud provider dynamically manages the allocation of machine resources and pricing is based on the actual amount of resources consumed by an application, rather than on pre-purchased units of capacity.

The emergence of these modern computing architectures is also expected to increase the demand for greater transparency in the market. Much like personal consumers of utilities such as electricity or bandwidth can internalize, compare and switch providers in the market, IT consumers will expect a similar experience and have already begun to demand it.

Cloud computing is the foundation of the platform economy. Platforms are fundamentally different from software. In the consumer market, examples of modern platform businesses include the likes of Airbnb, Uber and Facebook, all of which have built massively valuable software as a means to an end rather than the end itself. While platform business models in the commercial enterprise market are fewer, AWS itself is a perfect example. Consumers need not purchase hardware or even the complex software plumbing needed to spin up or tear down massive amounts of resources on a whim. AWS connected the seller of IT infrastructure (Amazon.com) with the consumer (web 2.x developers) and generated revenue as a consequence of utilization.

AWS represents only the first generation of platform architectures. The long-term potential flaw of AWS and competing cloud computing providers is the core business model, which is centralized and based on unilateral commerce and communication. This can and will only breed inefficiency at scale. It is the reason why the market is littered with examples of digital businesses that has moved away from cloud computing providers like AWS, opting instead to buy and manage their own IT infrastructure stack, for example, Dropbox. An escape to public cloud providers like AWS is not necessarily the strategic panacea.

SUMMARY OF THE INVENTION

The present invention provides systems and methods for buying, selling, and financing enterprise IT infrastructure capacity on a decentralized and distributed marketplace platform. In one embodiment, the decentralized and distributed IT marketplace platform is based on the distributed ledger technology. In one embodiment, the present invention provides a blockchain-based IT marketplace platform.

In one embodiment, the blockchain-based IT marketplace platform provides a decentralized supply chain for IT assets and financial services and establishes a self-regulating and trustless marketplace of connected consumers, producers, and financiers. In one embodiment, the blockchain-based IT marketplace platform enables asset management and disposition including developing, executing, financing and monetizing modern, cloud native, enterprise compute infrastructure and software applications.

In one embodiment, the blockchain-based IT marketplace platform of the present invention is an open platform purpose built to connect a global constellation of independent operators of compute, network and storage infrastructure ("producers"), software engineering teams and enterprise IT procurement teams ("consumers"), institutional and private capital ready to crowd fund the next global enterprise data expansion project, or cloud migration ("financiers"), and the software ecosystems that are the future of the digital economy ("App Ecosystems").

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3 shows an example of an infrastructure including 60 physical hosts running an average workload comprising of 1,750 total machines on an hourly basis.

FIG. 22 is a table displaying the Dynamic Index System (DIS) calculation by service level according to one embodiment of the present invention.

FIG. 23 is a sample of a Dynamic Index System Table listing current producer node levels with percentile-based indexes according to one embodiment of the present invention.

FIG. 24 displays the rating score calculation of a sample Producer Node Seller "A" according to one embodiment of the present invention.

FIG. 25 displays a running score card for Producer Node Seller "A" according to one embodiment of the present invention.

FIG. 30 is a screenshot of a blueprints tab in a GUI according to one embodiment of the present invention.

FIG. 33 is a screenshot of a workloads tab in a GUI according to one embodiment of the present invention.

FIG. 34 is a screenshot of a workloads tab in a GUI according to another embodiment of the present invention.

FIG. 40 is a screenshot of a compute grids tab according to one embodiment of the present invention.

FIG. 42 is a screenshot of an allocation cubes tab in a GUI according to one embodiment of the present invention.

DETAILED DESCRIPTION

Figure 1:
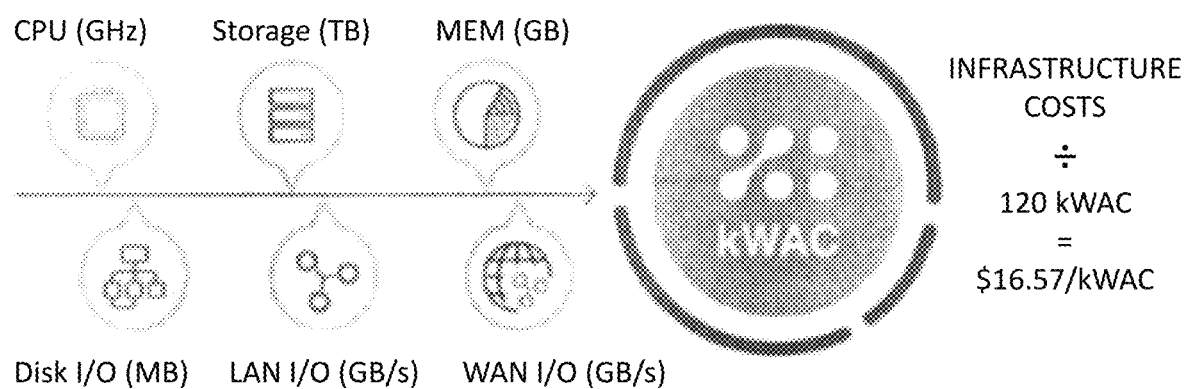
FIG. 1 shows a kWAC reading based on six key underlying utilization metrics according to one embodiment of the present invention.

The present invention relates to decentralized IT supply chain management. The present invention provides systems and methods for buying, selling, and financing enterprise IT infrastructure capacity on a decentralized and distributed marketplace platform.

For the purposes of definition, the IT supply chain includes compute/computer/computing manufacturers, distributors, resellers, owners, real estate providers (e.g., data centers), electricity providers, network providers, technical operators, business managers, insurance providers, as well as software developers (open source or commercial) and other consumers and related entities.

No matter how dominant a single centralized industry figure may be, it can never truly compete with the "crowd." Early success stories of first generation web commerce demonstrated that selling less of more is a very real and very large market strategy. The distributed and connected nature of the Internet made it possible for early players like Amazon, eBay and Google, and more recent players like Netflix and Apple (iTunes), to realize a whole new economic model called the long tail business model, which is based on the Long Tail Theory.

Back in 2009, the Applicant of the present invention rudimentarily theorized that the aggregate sum of computing resources that existed outside the mainstream operators of cloud computing will be larger than the single dominant player in the market. In 2009 neither the technology to facilitate free-flow workload and machine portability nor the distributed application architecture capable of spreading out across a peer-to-peer network existed.

The advent of containerization and serverless computing have spawned a new path in the application landscape. The abstraction away from underlying hardware has reached a point where it is technologically feasible to port workloads across cloud computing and physical hardware assets. Unlike the concepts of predecessor technology like virtual machines, container technology allows developers to achieve a level of code portability and deployment simplicity never seen before.

As cloud computing rapidly consolidates to a small handful of gigantic service providers, thereby blunting choice and transparency for developers and administrators, distributed computing on decentralized peer networks is becoming advantageous to provide transparent and flexible compute resources by aggregating vast distributed compute resources on the peer networks.

Decentralized peer-to-peer networks represent the next generation platform architecture, where the transaction records, payments, community adjudication, API frameworks, security, and resilience do not require central trust, nor do they require reliance on any one source of supply to meet the needs of demand.

In one embodiment, the present invention provides systems and methods for buying, selling, and financing enterprise IT infrastructure capacity on a decentralized and distributed marketplace platform. In one embodiment, the decentralized and distributed IT marketplace platform is based on the distributed ledger technology. A blockchain is a decentralized, distributed and public digital ledger that is used to record transactions across many computers. The blockchain is managed autonomously using a peer-to-peer network and a distributed timestamping server.

In one embodiment, the blockchain-based IT marketplace platform provides a decentralized supply chain for IT assets and financial services. The blockchain-based IT marketplace platform establishes a self-regulating and trustless marketplace of connected consumers, producers, and financiers. In one embodiment, the blockchain-based IT platform enables developing, executing, financing and monetizing modern, cloud native, and enterprise compute infrastructure and software applications.

In one embodiment, the blockchain-based IT marketplace platform of the present invention is an open platform purpose-built to connect a global constellation of independent operators of compute, network and storage infrastructure ("Producers"), software engineering teams and enterprise IT procurement teams ("Consumers"), institutional and private capital ready to crowd fund the next global enterprise data expansion project, or cloud migration ("Financiers"), and the software ecosystems that are the future of the digital economy ("App Ecosystems"). In another embodiment, the blockchain-based IT marketplace platform of the present invention also includes insurance companies providing insurance against defaults with financers ("Insurers") besides Producers, Consumers, Financiers, and App Ecosystems.

WAC: An IT Metering Algorithm

To realize the full power and potential of truly "utilized" IT, the IT supply chain should be treated like a utility—ubiquitous, pervasive, and absolutely price transparent. In doing so, the supply chain needs a single unit of measure that transcends politics, production, language and proprietary invention. In one embodiment, the blockchain-based IT marketplace platform of the present invention use the Workload Allocation Cube (WAC) algorithm disclosed in U.S. Pat. No. 8,756,302, which is assigned to the Applicant of the present invention and incorporated herein by reference in its entirety. The WAC algorithm established the first true "apples-to-apples" comparison for IT infrastructure and application services in the same manner that metrics in other industries do (e.g., kWh, Kbps, Gallon, etc.). The WAC algorithm is the standardized methodology to make and communicate effective, measurable IT financial decisions in less time with greater accuracy. It enables optimization of the cost and performance for a broad range of different application types consuming hardware resources in different proportions.

The WAC provides normalization of consumption metering across various resources, infrastructures, vendors, and providers. The WAC establishes a single, standardized proxy value for IT capacity and consumption. The WAC is the basis on which the IT supply chain can be treated like any other true utility. The normalization of measurement provides an "apples-to-apples" comparison of consumption, regardless of the underlying hardware or software technology stack. The WAC allows for measurement of IT infrastructure usage across public, private, physical and virtual infrastructure, regardless of location, underlying technology or management. Moreover, the WAC is compatible in a world of code containerized, consuming "function" as a service.

The WAC algorithm aggregates six (6) key underlying utilization metrics required to operate any software application into a single unit of measure: central processing unit (CPU), Memory, Storage, DISK I/O, LAN I/O, and WAN I/O. The WAC is calculated by taking individual readings of each compute resource, then combining them and posting them into a single hour WAC reading. WAC is scalable to different orders of magnitude for measurement. For instance, 1000 WACs can be expressed as 1 kWAC, and 0.001 WAC can be expressed as 1 mWAC. FIG. 1 shows a kWAC reading based on six key underlying utilization metrics according to one embodiment of the present invention.

Figure 2:
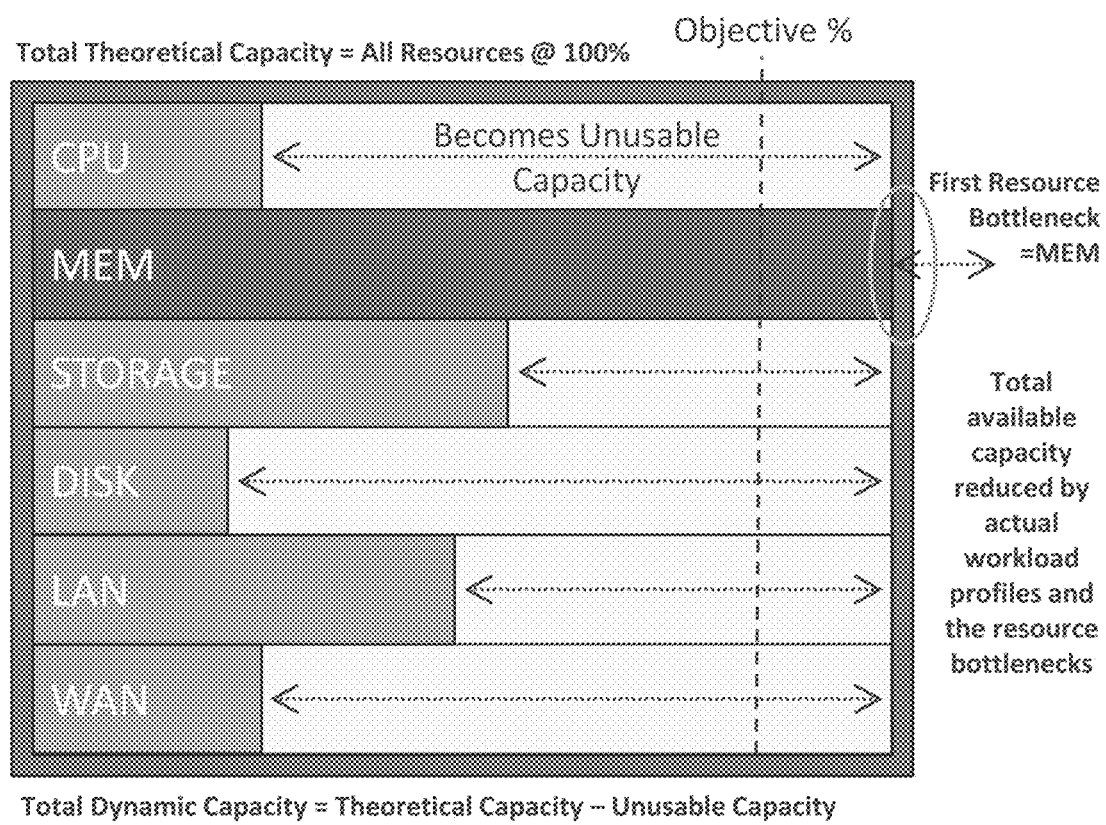
FIG. 2 illustrates the definitions of the theoretical capacity and the dynamic capacity according to one embodiment of the present invention.

In one embodiment, there is a theoretical capacity and a dynamic capacity for a certain IT infrastructure. A theoretical capacity represents the total number of WAC units that a given set of infrastructures could generate if all resources were completely utilized at all times. It is analogous to designing a workload that utilized 100% of processing power (e.g., CPU and/or graphic processing unit (GPU)), Memory, Storage, Disk, WAN, and LAN I/O simultaneously over time. This is the ideal situation that would result in 100% infrastructure utilization and efficiency. A dynamic capacity represents the maximum available capacity after all combined workloads have exhausted one of the six measured resources to 100%. It will effectively constrain the capacity of the other available resources until either the workload profile changes or more of the exhausted resource is added to the overall hardware configuration. FIG. 2 illustrates the definitions of the theoretical capacity and the dynamic capacity.

Each IT infrastructure has the following two key sets of physical resources that are used to calculate the IT infrastructure's capacity, including Server/Host Configuration and Network Configuration.

Server/Host Configurations include:
Number of Servers: the number of physical server hosts in the IT infrastructure.
CPU Sockets per Server: the number of physical CPUs per server.
Cores per CPU: the number of cores that are in each physical CPU.
CPU Speed: the actual maximum clock speed of the CPU.
Memory per Server: the amount of physical memory in each server.
Storage Available: the total amount of storage available to be used by the physical and virtual servers in the IT infrastructure. Storage Available should not represent a raw value, but rather a "formatted and ready to use" number after Redundant Array of Independent Disks (RAID), redundancy, and file system overhead are factored in.
Network Configuration is the configuration of the Network and any shared Storage, including:
Storage Area Network (SAN) Bandwidth: the maximum throughput speed available for data to be transferred from the physical or virtual servers in the IT infrastructure to the storage system.
LAN Bandwidth: the maximum local network speed available to transfer data between the physical or virtual machines in the IT infrastructure and others on the same local network.
WAN Bandwidth: the maximum Internet (or WAN) speed available to transfer data between the physical or virtual machines in the IT infrastructure and others on remote networks, or the Internet.
Hardware Constraints: there are several hardware constraints that can also impact the dynamic available capacity of the infrastructure.
vCPU per Machines Ratio: the number of virtual CPUs that is assigned to virtual machines on average. This information is typically gathered from a hypervisor manager. Common values are in the 1 to 4 range.
Machines per Core Ratio: this value represents an expected maximum number of machines sharing a single CPU core and is used to define an upper limit to the number of virtual machines planned to be hosted on the IT infrastructure. To measure the current number, divide the total number of virtual machines by the total number of cores. Common values are in the 4:1 and 6:1 machines/core range.
Target (Objective) Utilization: this value represents the maximum sustained load (as a % of maximum capacity) a consumer wants to utilize consistently of the available capacity all the time. This value ensures that there is a reserve capacity set aside for periodic spikes in consumption, maintenance cycles on physical servers, etc. while running at a highly efficient target level. Common values are in the 65% to 85% range, depending on the size of the hardware and the desired redundancy level.

Figure 4:
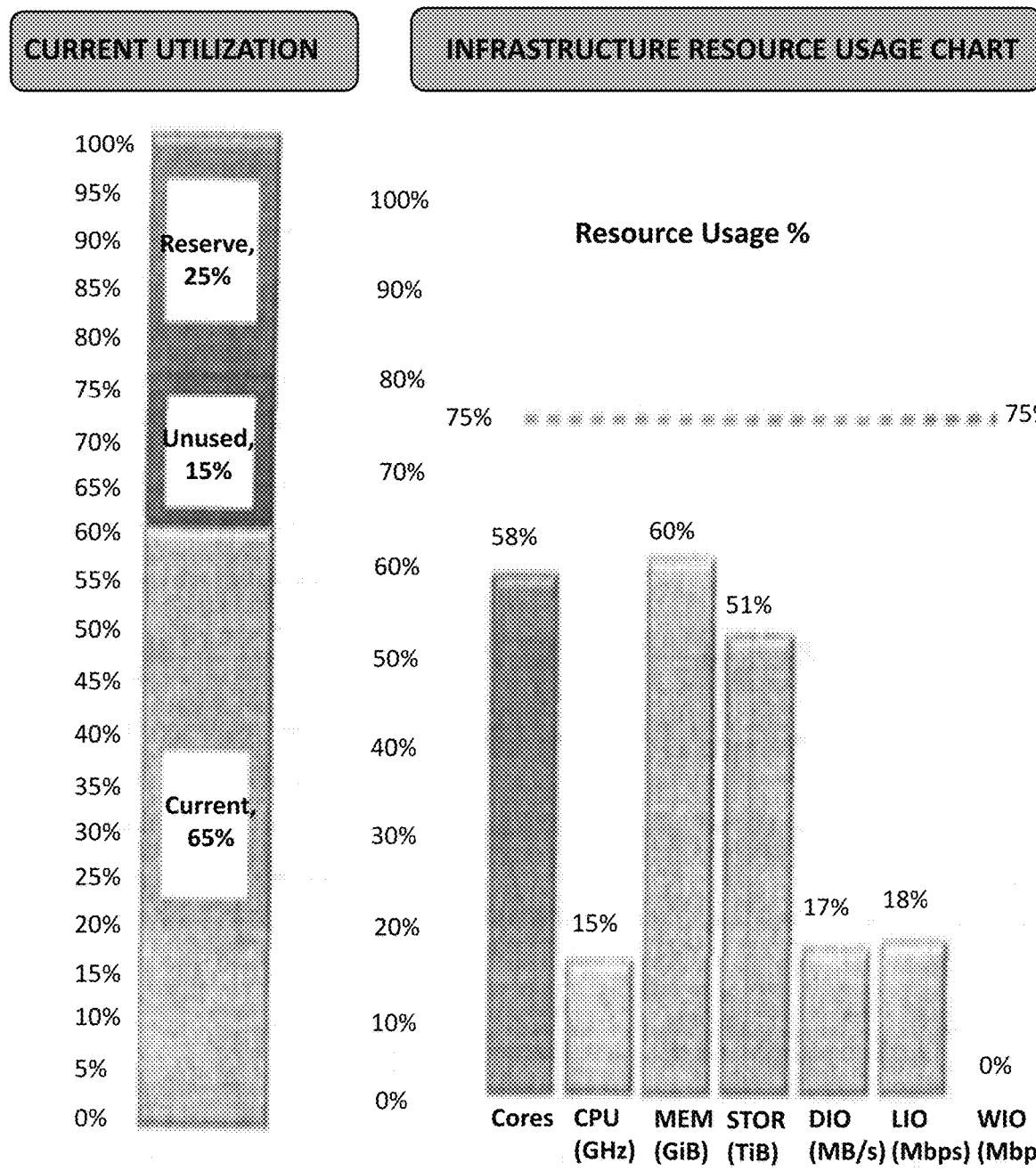
FIG. 4 shows the workload profile consumption levels running on the provided infrastructure as in FIG. 3.

FIG. 3 shows an example of an infrastructure including 60 physical hosts running an average workload comprising of 1,750 total machines on an hourly basis. The monthly capacity and monthly consumption levels can be calculated. FIG. 4 shows the workload profile consumption levels running on the provided infrastructure as in FIG. 3.

Figure 5:
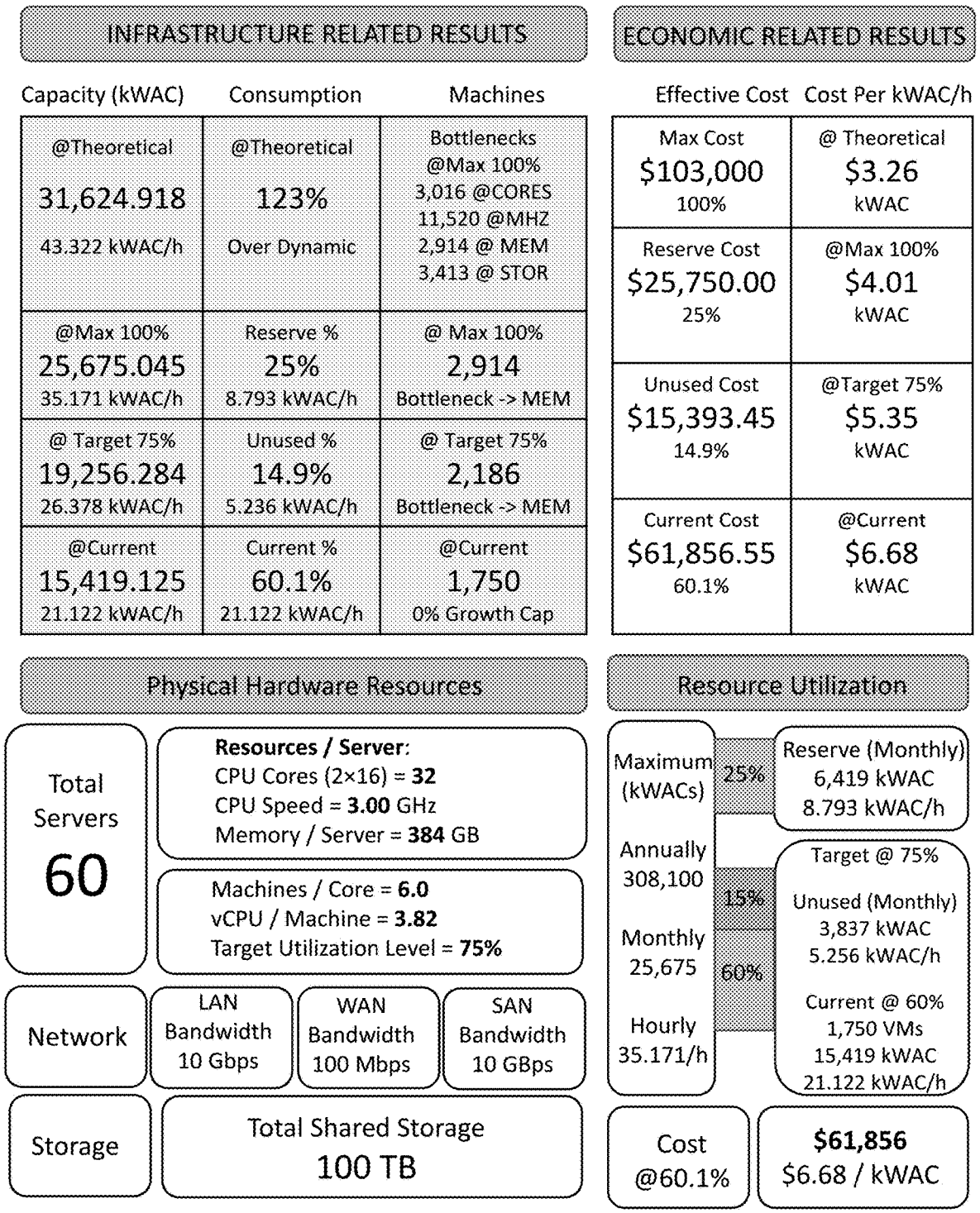
FIG. 5 is a full table with all the relevant results calculated for the infrastructure as in FIG. 3.

The theoretical and dynamic capacities are calculated in WACs as well as the resulting hardware resource levels being consumed by the total workload. In addition, the total amount of consumption by all the combined workloads is calculated in WACs. FIG. 5 is a full table with all the relevant results calculated for the infrastructure as in FIG. 3.

kWT: A New Cryptocurrency for the IT Supply Chain

In one embodiment, a new cryptocurrency is created on the blockchain-based IT marketplace platform of the present invention to bring about the broader horizon for the IT supply chain. In one embodiment, the new cryptocurrency is called the kWAC Token (kWT).

The problem with most cryptocurrencies is their "fiat nature." Most of the accrued value is purely driven by speculative interests. This represents a huge potential future problem for any participant. With no true foundation of value, price risk is extremely high. This extreme volatility makes networks like Ethereum, which utilizes the cryptocurrency Ether, tough to think about as a stable Enterprise IT supply chain platform. However, kWT has the backing of a legitimate commodity: Hard IT Assets. The blockchain-based IT marketplace platform has the unique ability of quantifying, at any one point in time, the available supply of hard IT assets that drive the IT market. By publishing total available capacity and its market value with utmost transparency, market participants on all sides can trust the price and make more meaningful and confident decisions about buying or selling.

The Blockchain-Based Marketplace Platform

Figure 6:
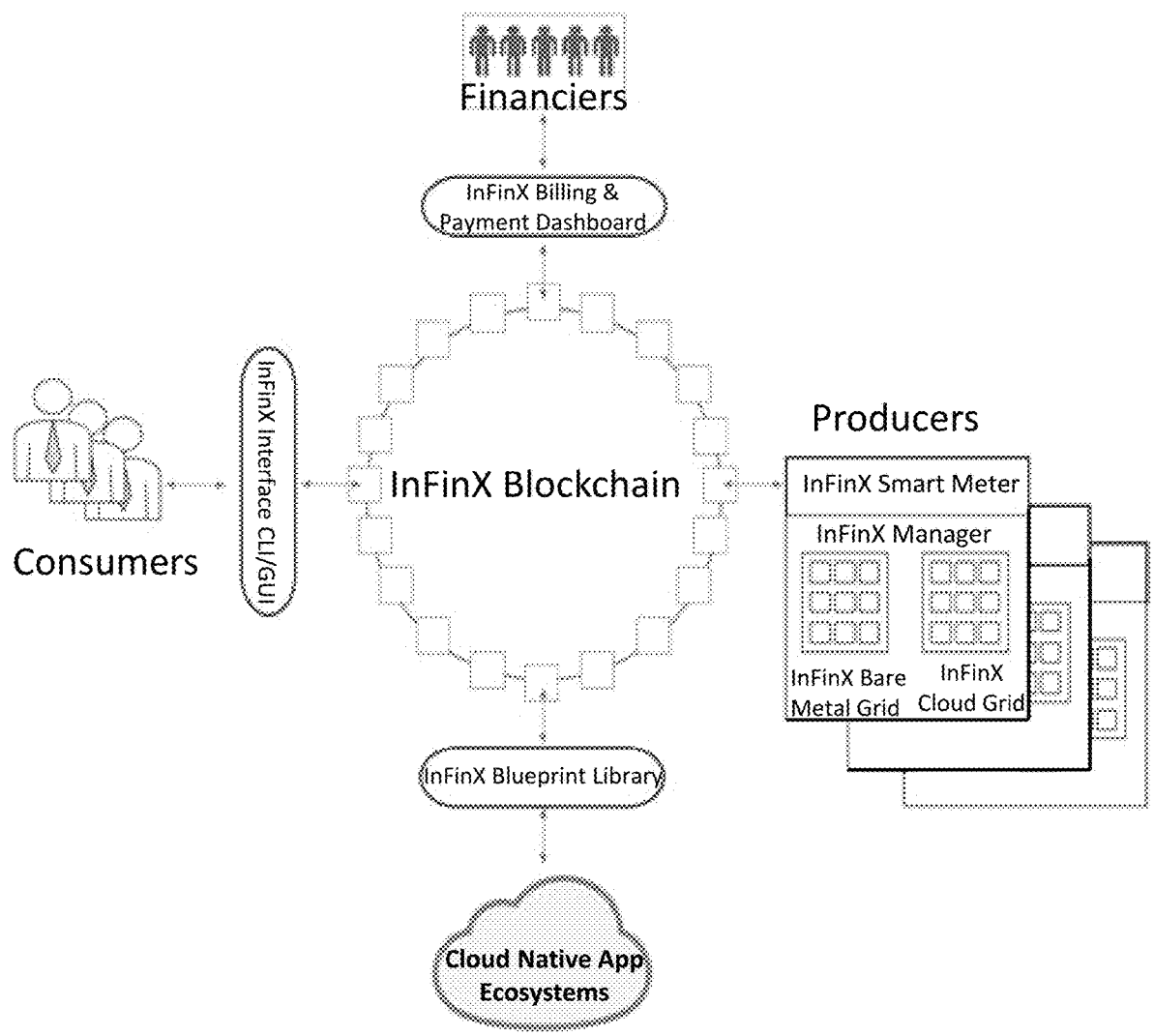
FIG. 6 is configuration of the blockchain-based IT marketplace platform according to one embodiment of the present invention.

FIG. 6 is a configuration of the blockchain-based IT marketplace platform according to one embodiment of the present invention. Producers are connected to the blockchain-based IT marketplace platform via WAC-based smart meters. Each producer provides bare metal compute grid and/or cloud compute grid. Consumers are operable to submit workload requests to the blockchain-based IT marketplace platform via a platform interface. Financiers are enabled to access a centralized view of every historical, live and pending financing transactions via a Financial Transaction Dashboard. The blockchain-based IT marketplace platform further provides a blueprint library for cloud native App ecosystems.

WAC-Based Smart Meter

Figure 7:
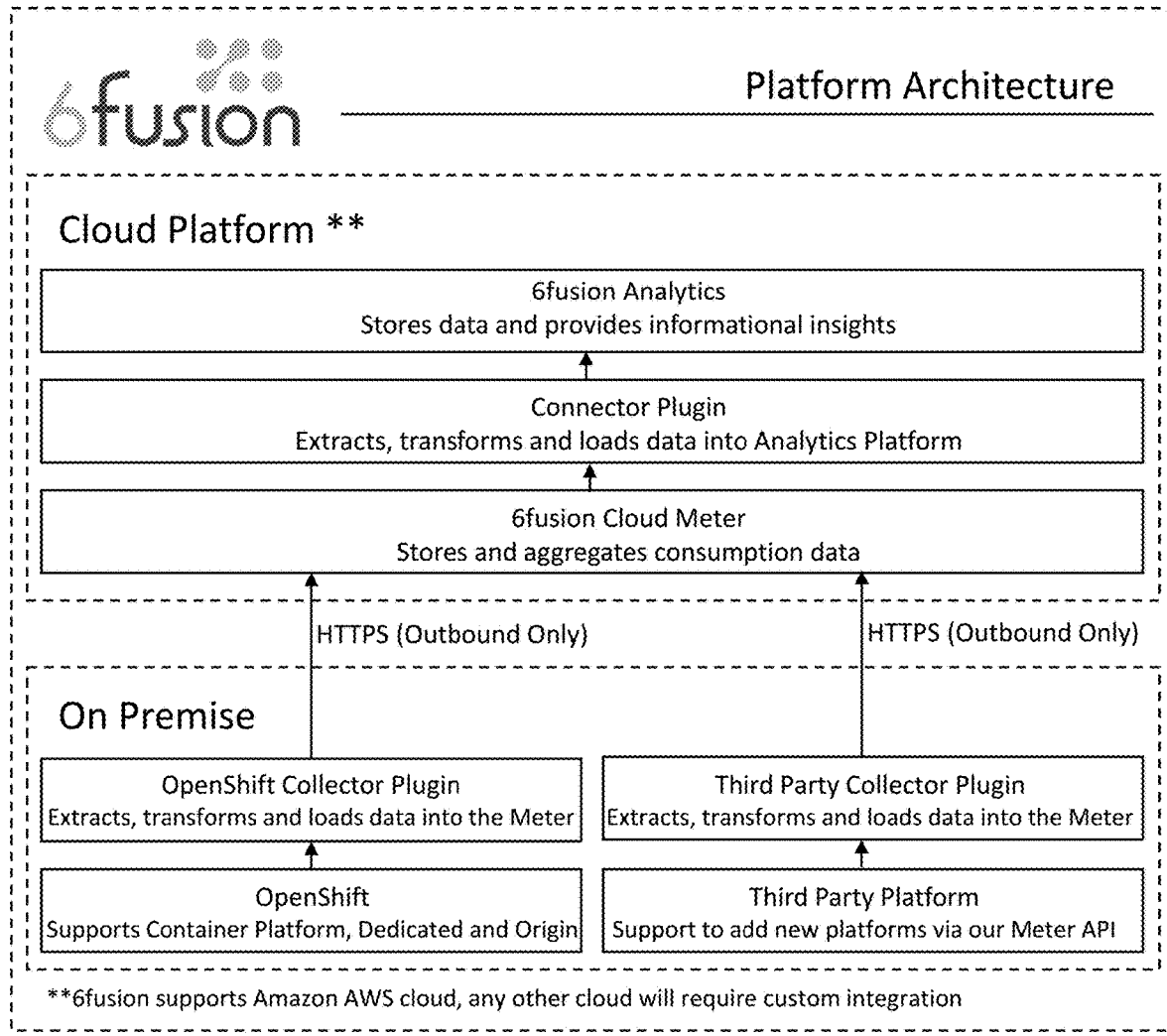
FIG. 7 illustrates data aggregation process via a proprietary smart IT meter according to one embodiment of the present invention.

The proprietary WAC-based smart meter is a virtual appliance that acts as a central data aggregator for the purpose of computing standardized measurement of compute, network and storage resources based on the WAC algorithm. The proprietary WAC-based smart meter is a central piece to the true "utilization" of information technology, designed to work with any underlying IT hardware layer and report data to a data presentation layer. FIG. 7 illustrates a data aggregation process via the proprietary WAC-based IT meter according to one embodiment of the present invention.

The proprietary WAC-based smart meter is the bridge between the enterprise IT environments it measures and the blockchain-based IT marketplace platform of the present invention. In one embodiment, the proprietary WAC-based smart meter includes a core Smart Meter host, a manager module, at least one resource node, and at least one node group.

Every deployed smart meter constitutes a node on the blockchain-based IT marketplace platform, capable of the deploying ERC20 smart contracts, broadcasting surplus capacity across the platform for consumers to utilize and pay for in kWT. The manager module in a proprietary smart meter is the control point for a producer to organize resource nodes and node grids. The core smart meter host transmits raw data to the manager module via a smart meter API. The manager module is operable to compute kWAC and kWT based on the raw data from the smart meter host.

A resource node is a logical grouping of resources, including CPU, Memory, Storage and Network. From within the manager module, resources are assigned to resource nodes dynamically. Resource nodes are then broadcast on the blockchain-based IT marketplace platform. Producers on the blockchain-based marketplace platform are enabled to securely ringfence third party workloads from any private commercial workloads.

A node grid is a logical grouping of resource nodes spanning a single logical network of a producer. A node grid includes resources on premise and/or resources derived from shared public cloud computing environments.

Platform Interface

Figure 8:
FIG. 8 is a screenshot of the user interface according to one embodiment of the present invention.
Figure 9:
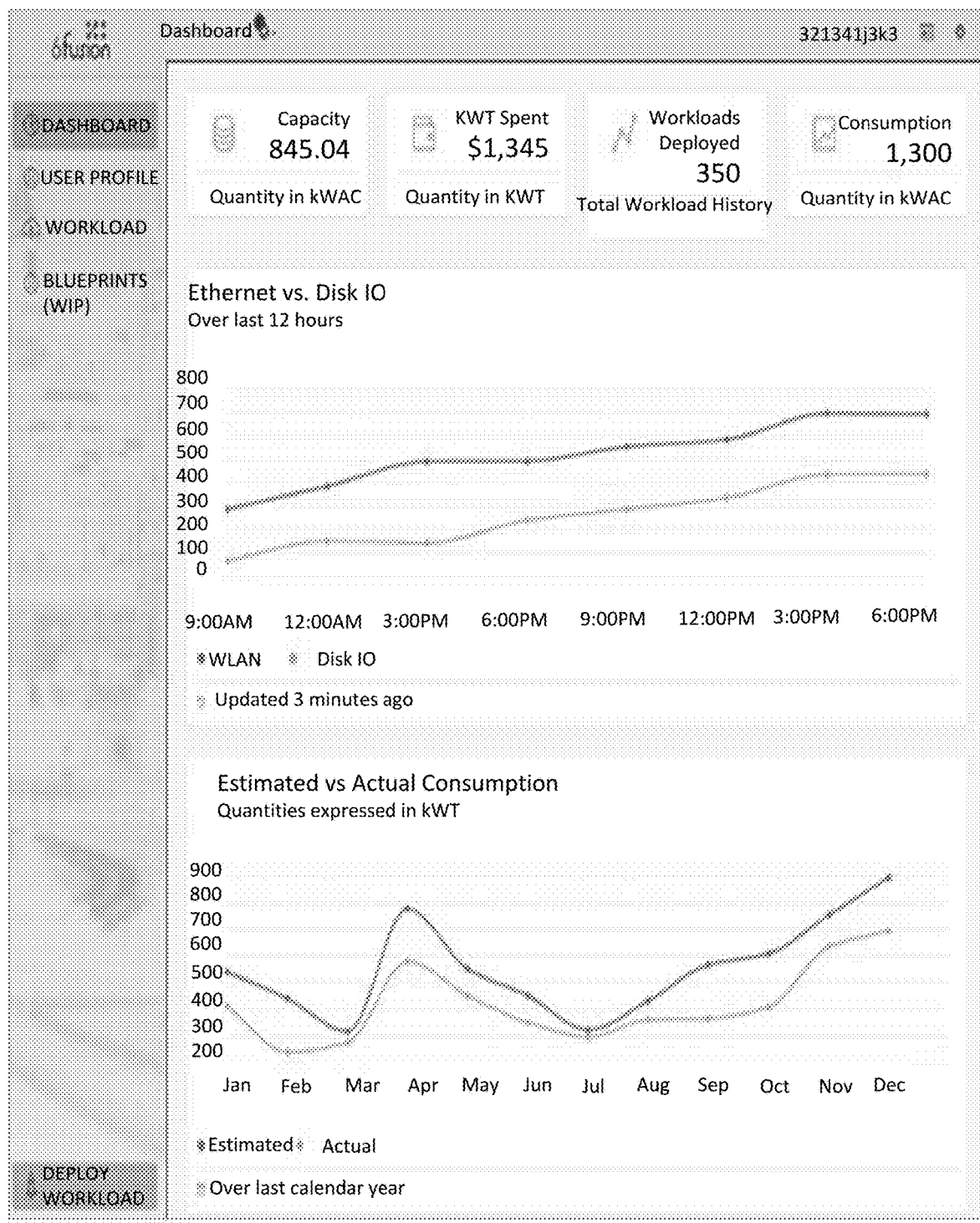
FIG. 9 is a screenshot of the user interface according to another embodiment of the present invention.

The blockchain-based marketplace platform provides an open web portal and connects various parties including but not limited to producers and consumers via an interface. FIG. 8 is a screenshot of the user interface according to one embodiment of the present invention. FIG. 9 is a screenshot of the user interface according to another embodiment of the present invention.

Figure 10:
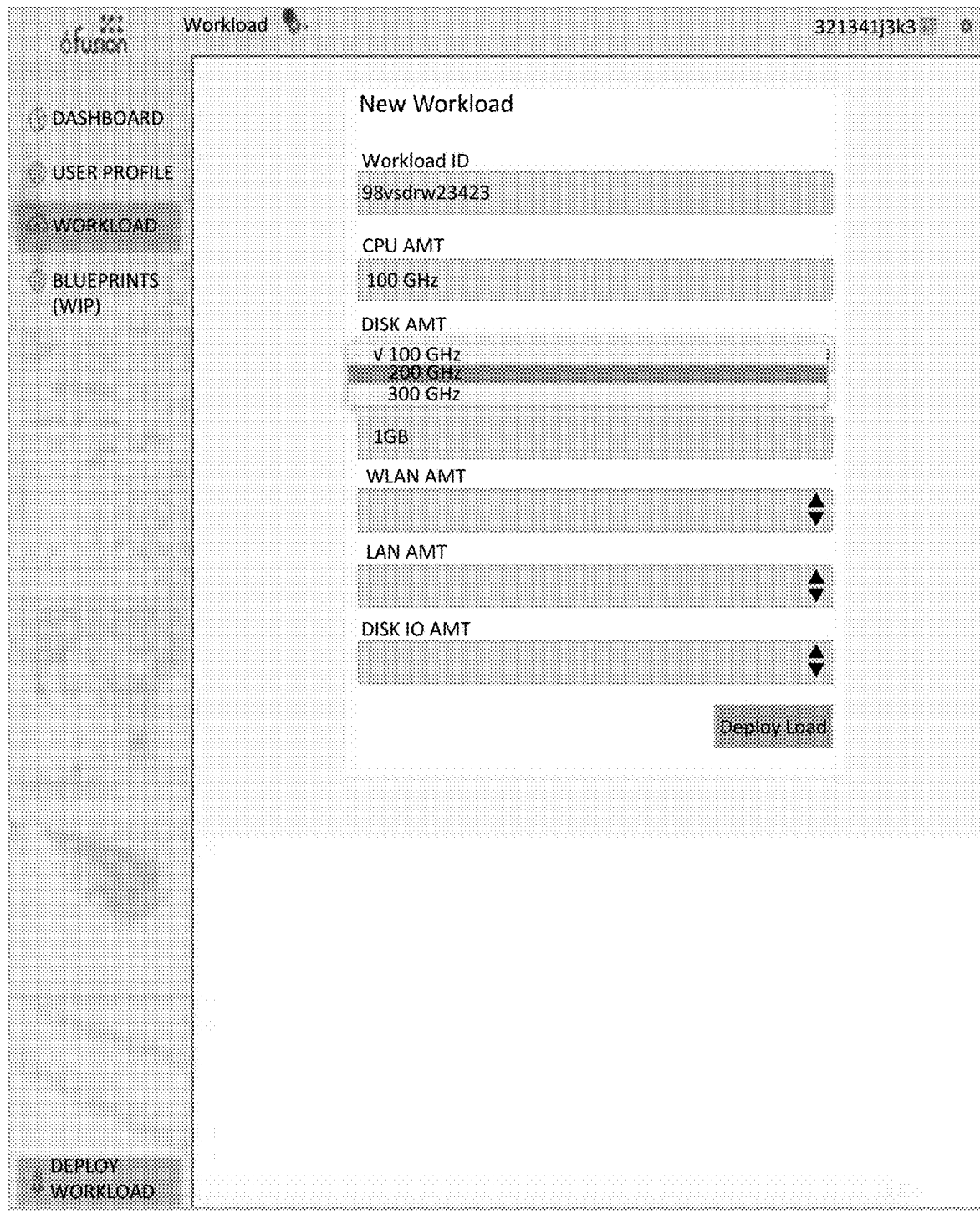
FIG. 10 is a screenshot of workload manifest according to one embodiment of the present invention.

For consumers seeking to deploy new workloads, the platform interface is operable to collect all the relevant manifest information needed for the blockchain-based marketplace platform to fulfill the workload request. The workload manifest includes the following workload details: Compute Type (Small, Medium, Large, Custom) including CPU (Hz), Memory (Bytes), Storage (Bytes), Disk I/O (Bytes/sec), LAN I/O (Bytes/sec) and WAN I/O (Bytes/sec); Blueprint including Container Images and Configuration; and Service Level (Basic, Standard, Premium). FIG. 10 is a screenshot of a workload manifest according to one embodiment of the present invention.

Figure 11:
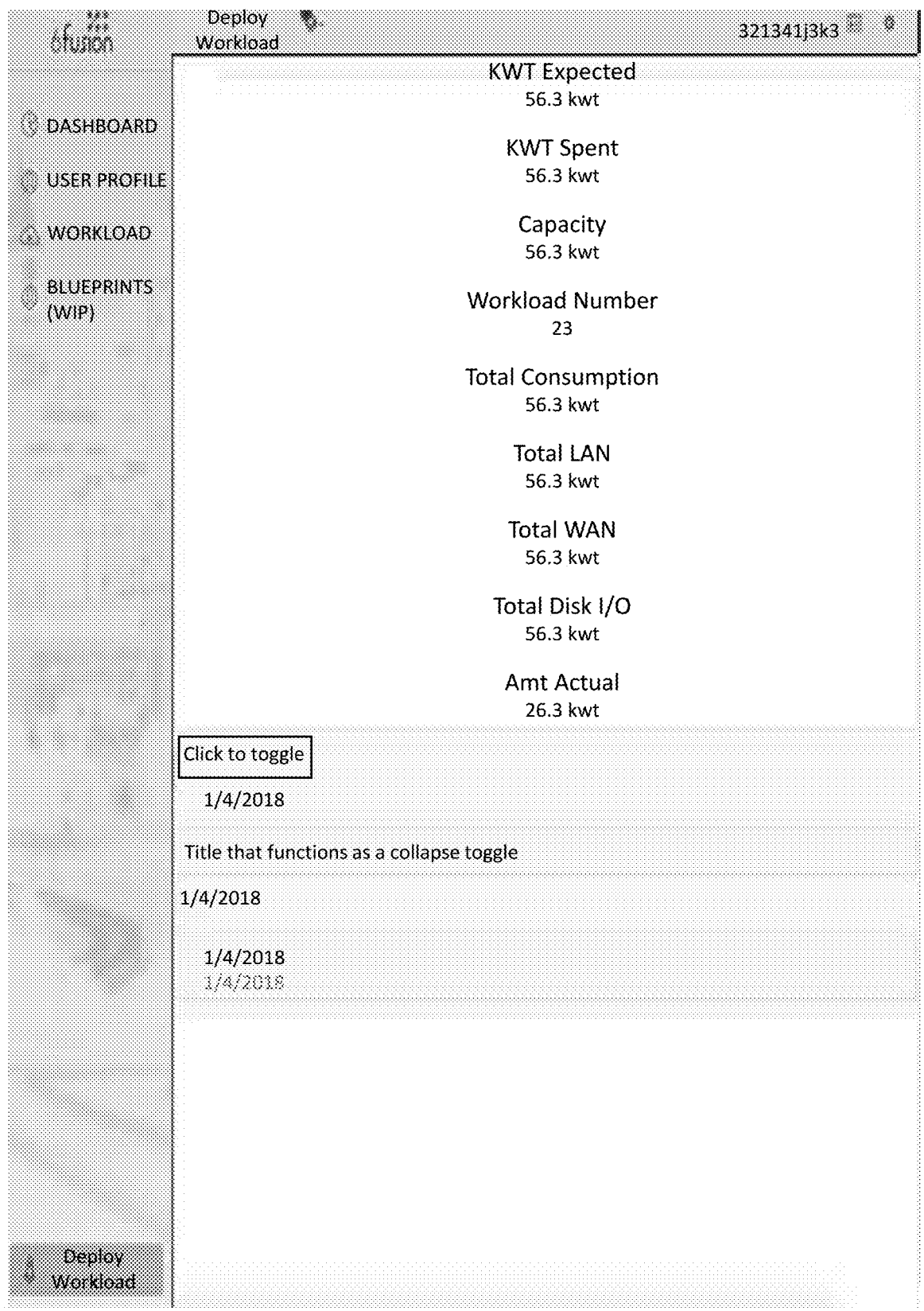
FIG. 11 is a screenshot of a consumption summary for a consumer on Jan. 3, 2018 according to one embodiment of the present invention.
Figure 12:
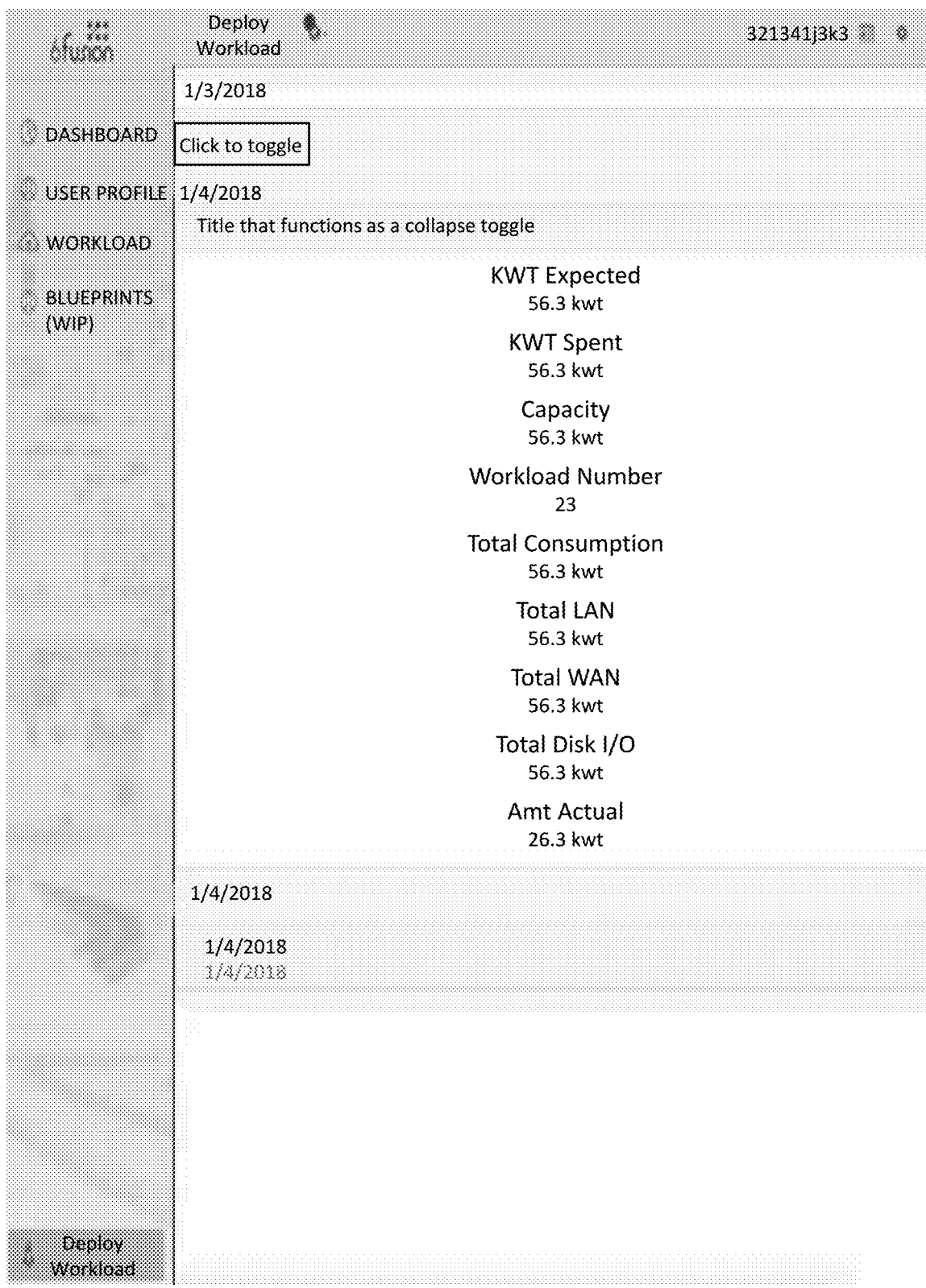
FIG. 12 is a screenshot of a consumption summary for a consumer on Jan. 4, 2018 according to one embodiment of the present invention.

Once a consumer submits a workload request, the maximum amount of kWT is calculated to execute the workload. The amount of kWT required is then verified against the balance of kWT in the consumer's wallet. If there is enough kWT in the consumer's wallet to execute the workload request, they are permitted to execute the "deploy load" function. Failed wallet tests return the consumer to the platform Interface to make changes to the workload request. Once the consumer selects to "deploy load", a smart meter calculates how much of the requested resources were consumed. When the workload finishes and terminates, the consumer is presented with a consumption summary including how much resource the workload used and how much the corresponding total kWT needs to be paid. The amount owed will then be transferred to the producer's wallet. The platform interface provides a complete historical record of every workload completed by the consumer. FIG. 11 is a screenshot of a consumption summary for a consumer on Jan. 3, 2018 according to one embodiment of the present invention. FIG. 12 is a screenshot of a consumption summary for a consumer on Jan. 4, 2018 according to one embodiment of the present invention.

For consumers seeking to fund either new infrastructure or expansion infrastructure, the blockchain-based IT marketplace platform provides a seamless process to solicit, contract and fulfil end-to-end financing relationships with any combination of public institutional or private resources.

Financial Transaction Dashboard

The blockchain-based IT marketplace platform provides a Financial Transaction Dashboard displaying a centralized view of every historical, live and pending financing transaction in a financier's portfolio, accessible simply with a financier's unique ID. Unlike other blockchain solutions, the blockchain-based IT marketplace platform of the present invention allows for one-to-one transactional relationships. This is important because while every transaction is recorded on the blockchain, potentially sensitive identity and financial data is obscured from everyone but the parties to a transaction. The Dashboard also provides a view into live financing requests currently on the blockchain-based IT marketplace platform. Financing requests include all the relevant information needed for potential financiers to make a decision to fund. Financing is allocated on a first come first serve basis.

Figure 13:
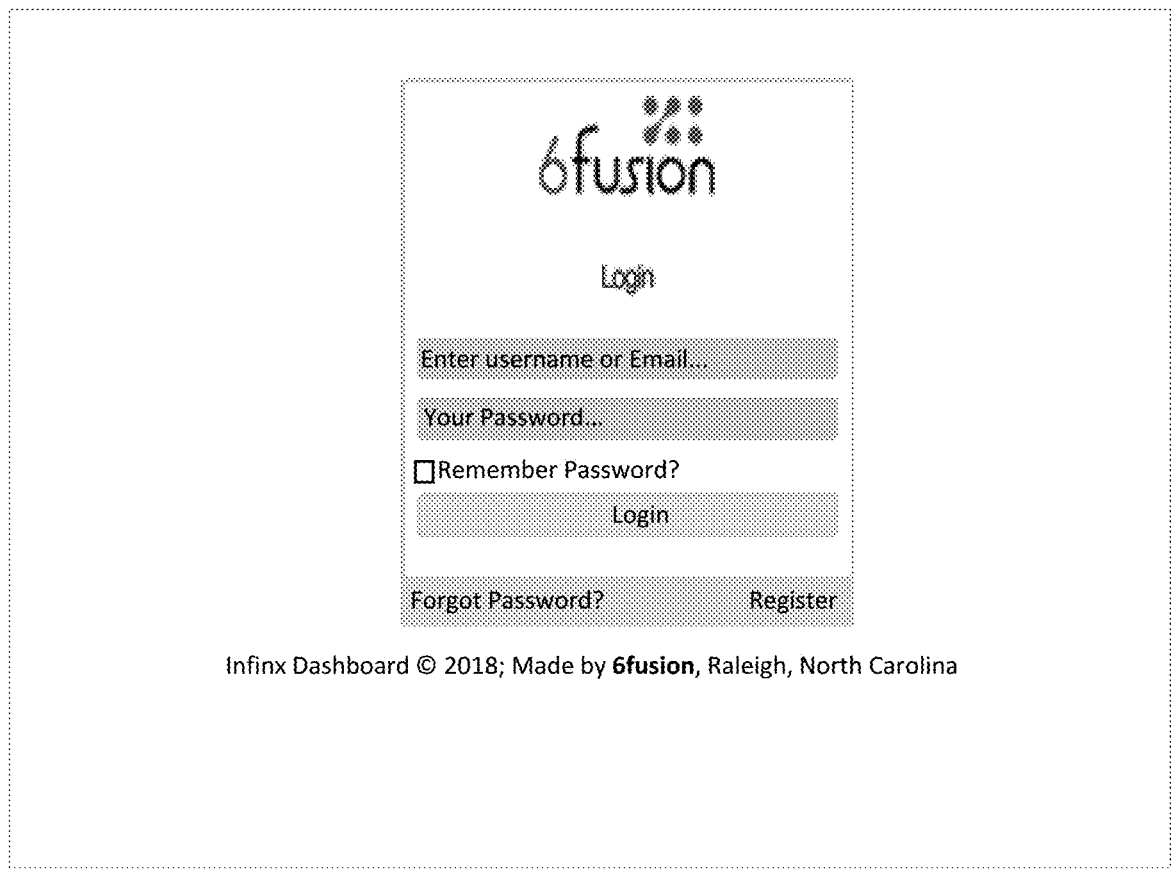
FIG. 13 is a screenshot of the login page of the Financial Transaction Dashboard according to one embodiment of the present invention.
Figure 14:
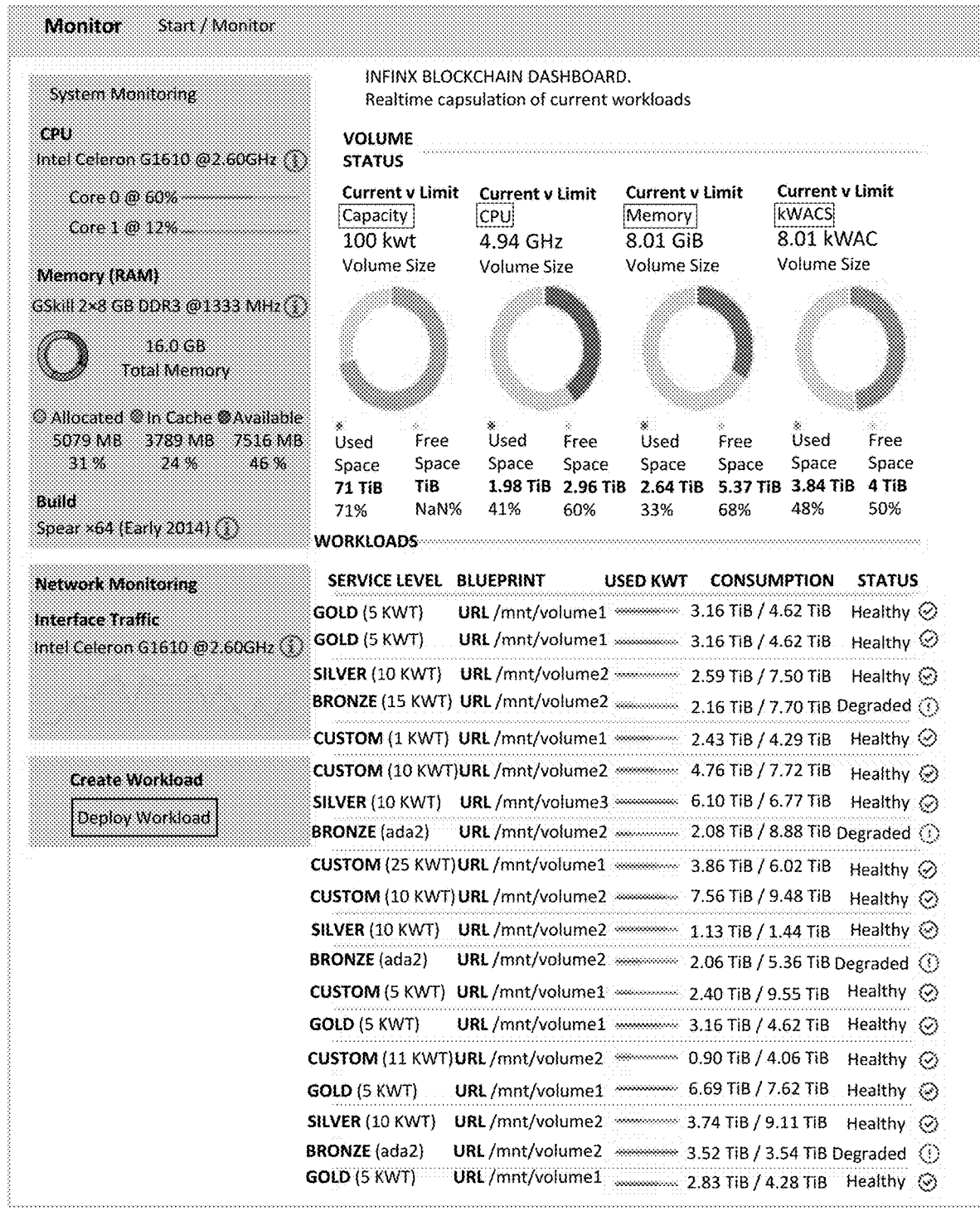
FIG. 14 is a screenshot of the Financial Transaction Dashboard according to one embodiment of the present invention.

FIG. 13 is a screenshot of the login page of the blockchain-based IT marketplace platform according to one embodiment of the present invention. FIG. 14 is a screenshot of a dashboard according to one embodiment of the present invention. The dashboard shows system monitoring information, displays a list of workloads and their status, provides ability to deploy new workloads, and displays information about current consumption compared to the capacity limit.

Blueprint Library

The blockchain-based marketplace platform provides the next generation commercial path for cloud native software using consumption-based licensing. The standardized WAC metric applied to hardware infrastructure serves also as a perfect proxy for software consumption.

In one embodiment, the blockchain-based IT marketplace platform includes a blueprint library, which is a private store available to consumers to pull and deploy any certified containers. Consumption is tracked hourly on the platform blockchain and settlements between consumers and sellers are fast and transparent. The blueprint library is open to any commercial or open source code shipped as a container. The blueprint specifies whether or not using the container is fee based. If so, usage is automatically tracked and settled on the blockchain-based marketplace platform of the present invention.

In one embodiment, the blockchain-based IT marketplace platform implements quality control standards to ensure consumers have visibility into the code before deploying it. In one embodiment, the blockchain-based IT marketplace platform provides a validation and certification service. In another embodiment, the validation and certification service is based on a community driven adjudication system.

Quorum-Based IT Marketplace Platform

On the surface, it makes obvious sense to put the entire IT supply chain onto the blockchain. However, unlike other novel uses of the blockchain technology, an industry supply chain comes with it all of the risk and security challenges from any financial banking system. For that reason, the blockchain-based marketplace platform is based on the Quorum project created by JP Morgan Chase according to one embodiment of the present invention.

Quorum is the only foundation in the market at the time of the invention that delivers the necessary privacy and security needed for one-to-one financing transactions between producers and financiers as well as the performance and throughput required to process trillions of smart meter readings every day.

Connecting producers and financiers on a public facing blockchain requires care and consideration. The Quorum-based IT marketplace platform of the present invention features transaction validation throughout the network. However, it supports permissioned transactions to ensure single party transactions remain confidential. Private smart contracts are known to and validated by parties to the contract and approved by third parties. Quorum's zero-knowledge security layer enables assured private settlement.

One of the glaring limitations of Ethereum has been the inability to decompile smart contract code. Unlike traditional software development processes, there has been no near equivalent to Simple DirectMedia Layer (SDL) best practices for Solidity, a contract-oriented programming language for writing smart contract. However, the Quorum-based IT marketplace platform of the present invention utilizes Comae Technologies' Porosity to decompile smart contracts for greater trust and transparency and address DAO vulnerabilities, call stack vulnerabilities, and time dependence vulnerabilities.

In one embodiment, Istanbul Byzantine Fault Tolerant (IBFT) consensus protocol is used in the Quorum-based IT marketplace platform of the present invention. IBFT is inspired by the Practical Byzantine Fault Tolerant (PBFT) protocol. However, the original PBFT was not suited for blockchain use cases. There is no specific "client" that will send out a request and wait for a result. However, all of the validators in IBFT are seen as clients that can send out requests. Furthermore, to keep producing blocks in a predictable manner, a proposer is continuously selected in each validation round to create a block for consensus. A verifiable new block is expected to be generated for each consensus round.

IBFT is a state machine replication algorithm. All of the validators maintain a state machine replica in order to come to consensus. IBFT inherits from the original PBFT by using 3-phase consensus algorithm, PRE-PREPARE, PREPARE, and COMMIT. A system can tolerate at most of F faulty nodes in an N validator nodes network, where N=3F+1. In other words, there needs to be a minimum of 4 validators in order for consensus to occur. Before each round, the validators elect one of the validators in the network as a proposer, in a round robin fashion by default.

Figure 15:
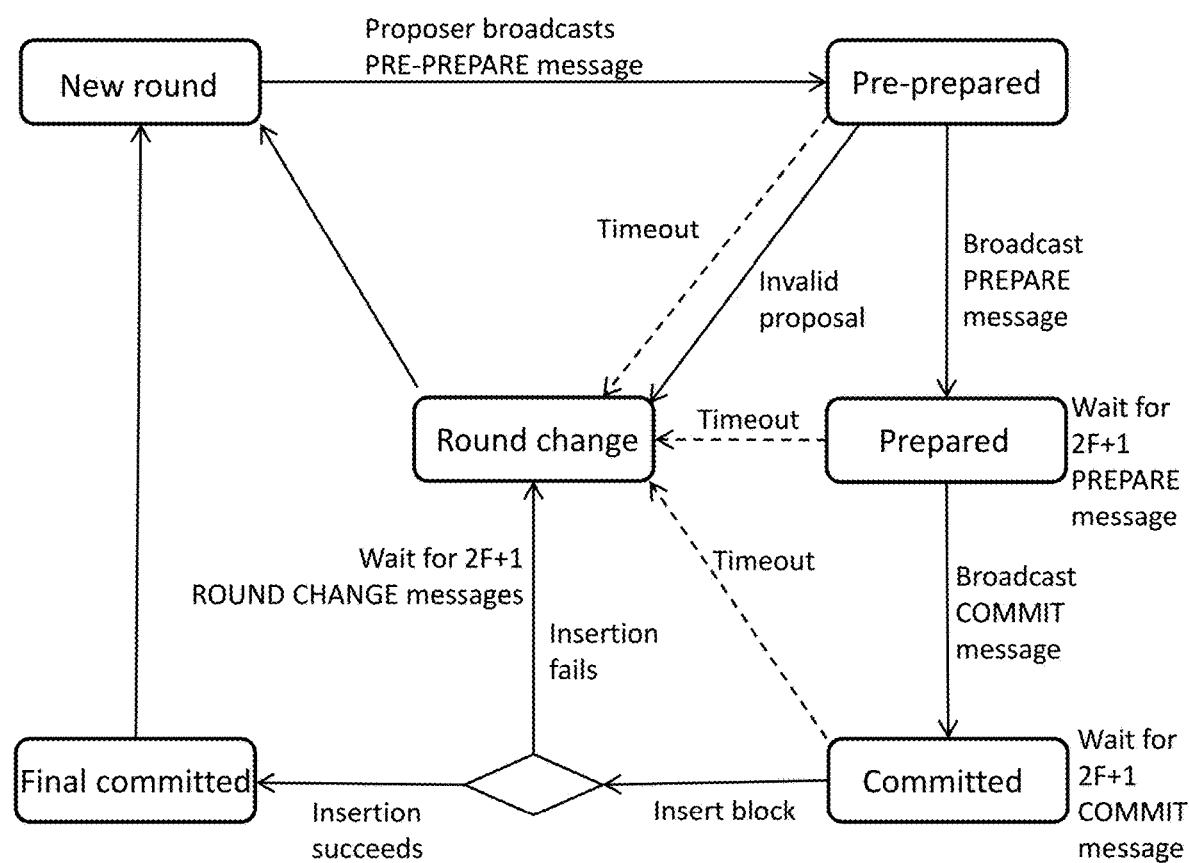
FIG. 15 illustrates different states in a validation round on the blockchain-based IT marketplace platform according to one embodiment of the present invention.

FIG. 15 illustrates different states in a validation round according to one embodiment of the present invention. In a NEW ROUND state, a proposer is to send a new block proposal, and validators wait for a PRE-PREPARE message. In a PRE-PREPARED state, a validator has received PRE-PREPARE message and broadcasts a PREPARE message. Then the validator waits for 2F+1 of PREPARE or COMMIT messages. In a PREPARED state, a validator has received 2F+1 of PREPARE messages and broadcasts COMMIT messages. Then it waits for 2F+1 of COMMIT messages. In a COMMITTED message, a validator has received 2F+1 of COMMIT messages and is able to insert the proposed block into the blockchain. In a FINAL COMMITTED message, a new block is successfully inserted into the blockchain and the validator is ready for the next round. In a ROUND CHANGE state, a validator is waiting for 2F+1 of ROUND CHANGE messages on the same proposed round number.

Even though Quorum has the ability to use several different consensus algorithms, IBFT is chosen for several reasons over a traditional Proof of Work (PoW) consensus mechanisms found in most blockchains. First, and most obviously, transaction per second (TPS) times are slow on the Ethereum blockchain since each node in the network must maintain the state of the blockchain. The time for transactions is only increasing since the total number of transactions is also increasing. Due to a hardcoded limit in Ethereum, it maxes out at roughly 15 TPS. The Quorum-based IT marketplace platform is a private consortium blockchain, which is able to overcome these limitations through the use of IBFT and process thousands of transactions per second.

The second problem the Quorum-based IT marketplace platform seeks to overcome is block settlement times. It takes tens of minutes to settle a block on a traditional PoW or Proof of Stake (PoS) based system, which is a problem for a high-traffic high-throughput environment where hundreds of transactions a second are processed. With an IBFT consensus algorithm, blocks are finalized almost immediately and settlement occurs in less than one second on the Quorum-based IT marketplace platform of the present invention.

The third problem addressed by the Quorum-based IT marketplace platform is blockchain forking. In current blockchains, a fork can occur for many reasons. For example, but not for limitation, a system needs update. Also, for example not for limitation, a blockchain has been attacked and invalid blocks are produced. In both cases there is a risk of previously invalid blocks becoming valid, or, worse yet, previous valid blocks becoming invalid. The IBFT consensus protocol eliminates these risks since all blocks are finalized instantly, which means that there can be no forks and valid blocks must be somewhere in the main blockchain. To prevent a faulty node from building a different blockchain from the main blockchain, each validator appends, at minimum, 3 nodes of received COMMIT signatures to the extra data field in the block header before adding a block to the main blockchain. Adding the COMMIT signatures to the block header makes each block self-verifiable.

Figure 16:
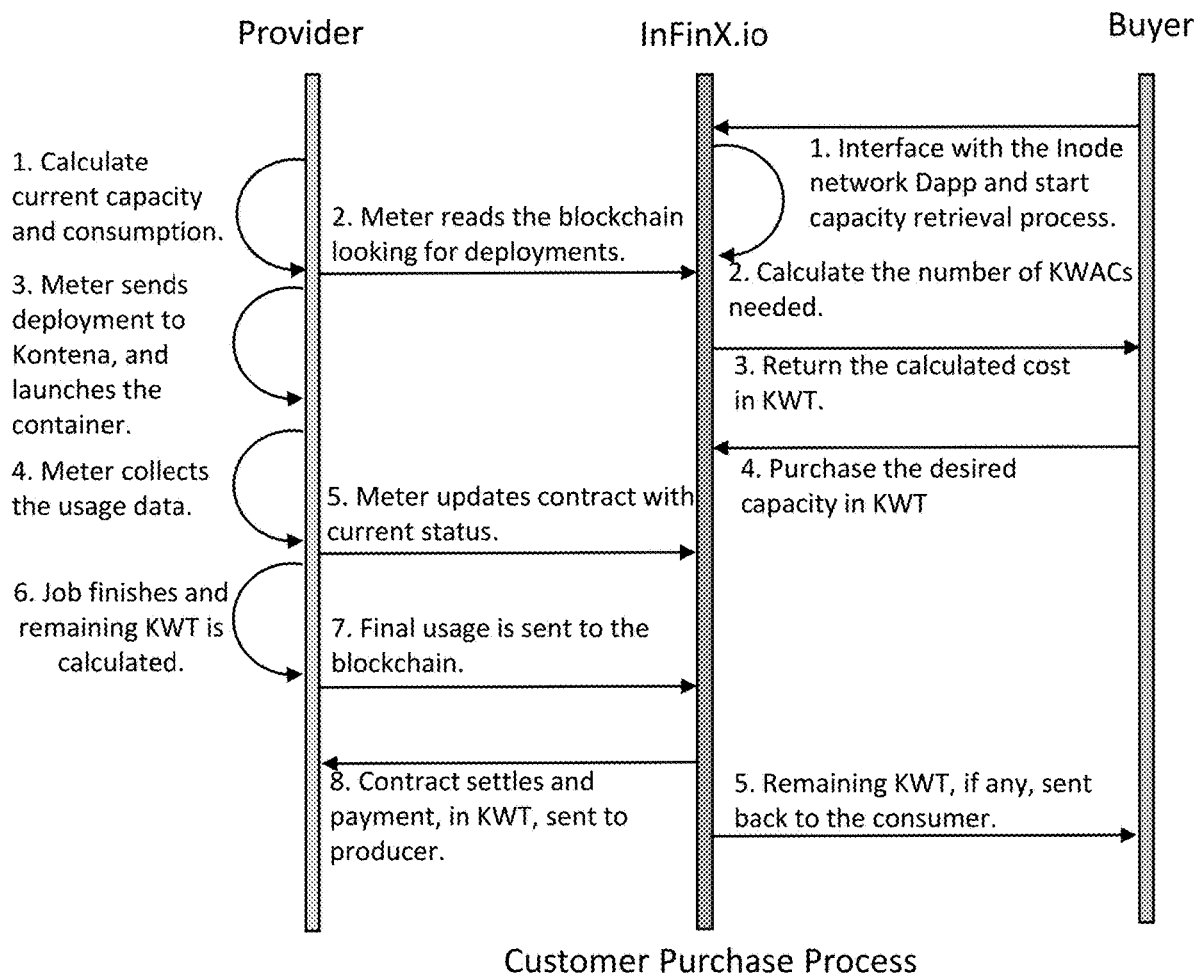
FIG. 16 illustrates a sequence of events executed by a primary smart contract on both sides of a transaction according to one embodiment of the present invention.

The primary smart contract on the Quorum-based IT marketplace platform executes a sequence of events independently on both sides of a transaction as illustrated in FIG. 16.

The consumer side of the transaction and settlement occur as follows:
(1) A buyer interfaces with the inode network via an API or interface.
(2) A smart meter calculates the number of WACs needed.
(3) The blockchain-based IT marketplace platform returns the estimated costs in kWT.
(4) The buyer purchases the capacity and sends kWT to an escrow.
(5) When job is finished, any remaining kWT is refunded.

The producer side transaction and settlement occur as follow:
(1) A producer calculates the current capacity and consumption.
(2) A smart meter continuously monitors the blockchain-based IT marketplace platform for possible jobs.
(3) The smart IT meter sends the workload to a workload manager and a job launches.
(4) The smart meter collects usage data.
(5) The smart meter updates the contract on the platform blockchain.
(6) The job finishes and remaining kWT, if any, is calculated.

If job is not finished and kWT runs out, the job will end in failure.
(7) Final usage of workload is sent to blockchain for settlement.
(8) Final settlement occurs and payment is sent from Escrow to the producer.

Figure 17:
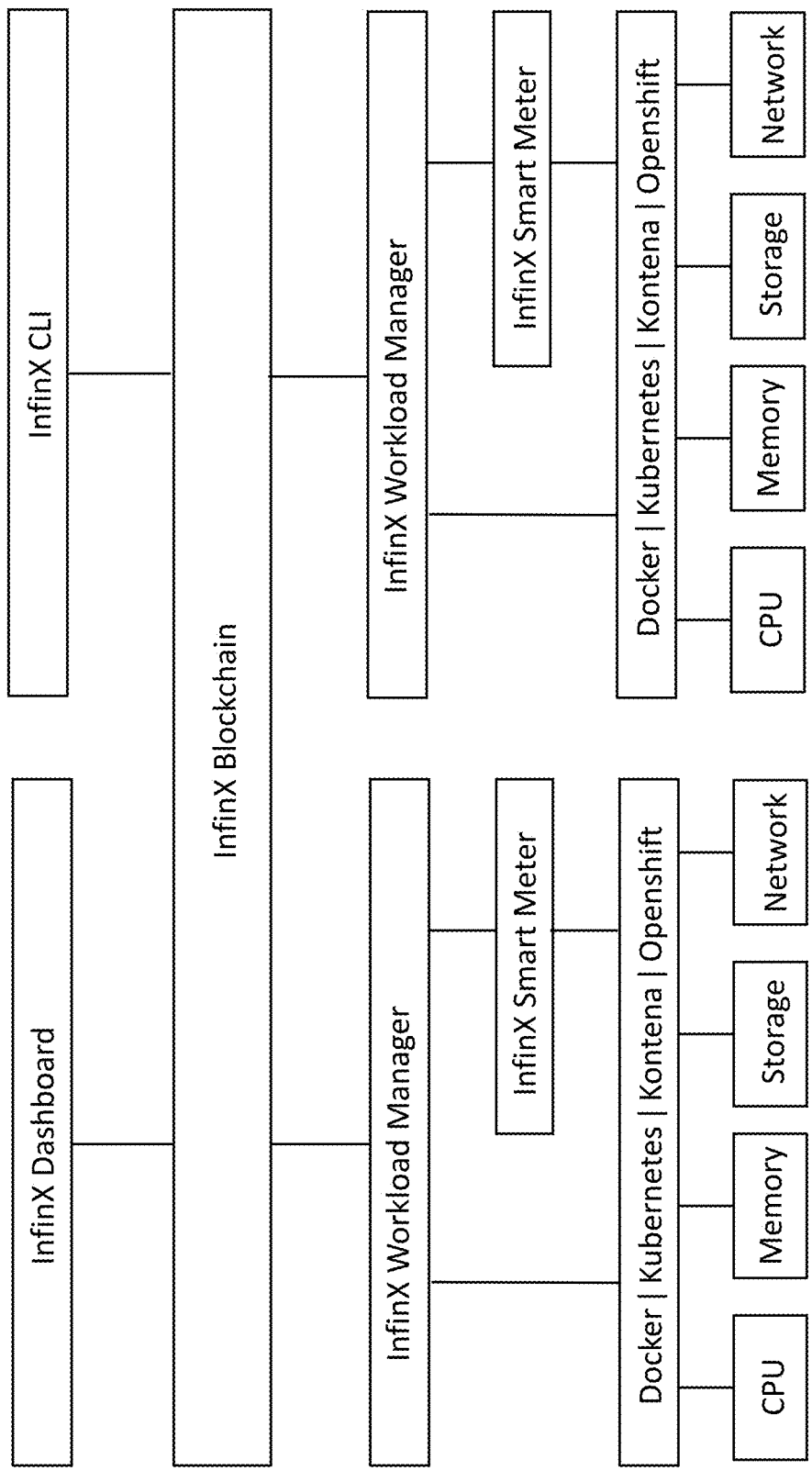
FIG. 17 is an architecture configuration of the blockchain-based IT marketplace platform according to one embodiment of the present invention.

FIG. 17 is an architecture configuration of the blockchain-based IT marketplace platform according to one embodiment of the present invention.

Figure 18:
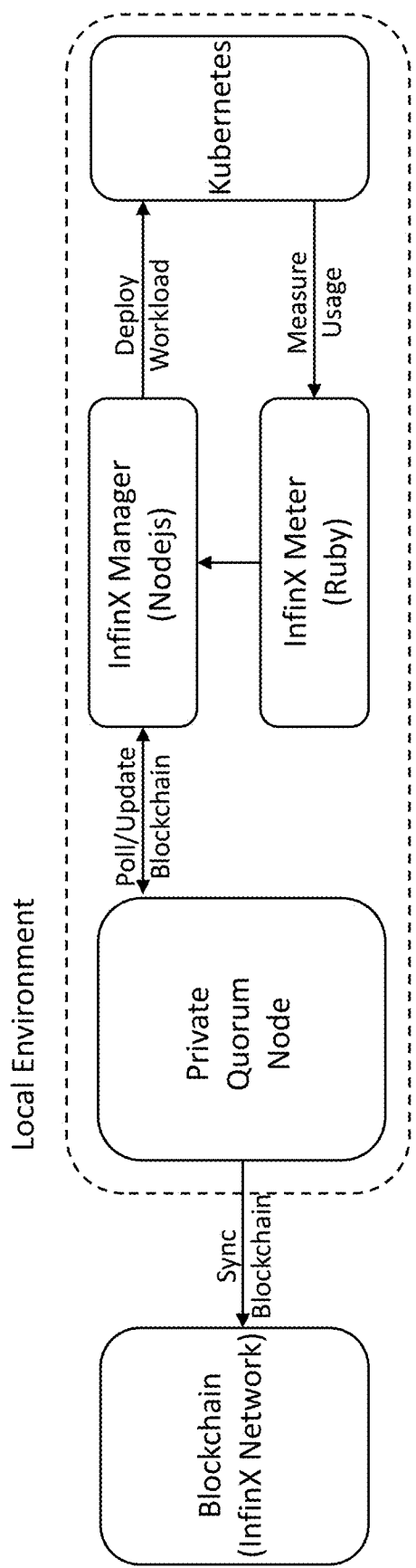
FIG. 18 is a backend architecture configuration of the blockchain-based IT marketplace platform according to one embodiment of the present invention.

FIG. 18 is a backend architecture configuration of the blockchain-based IT marketplace platform according to one embodiment of the present invention. Various private nodes are connected to the blockchain-based IT marketplace platform of the present invention. A private node on the blockchain-based IT marketplace platform can be a producer node. Every private node is connected to the local IT infrastructure via a WAC-based smart meter including a workload manager.

Figure 19:
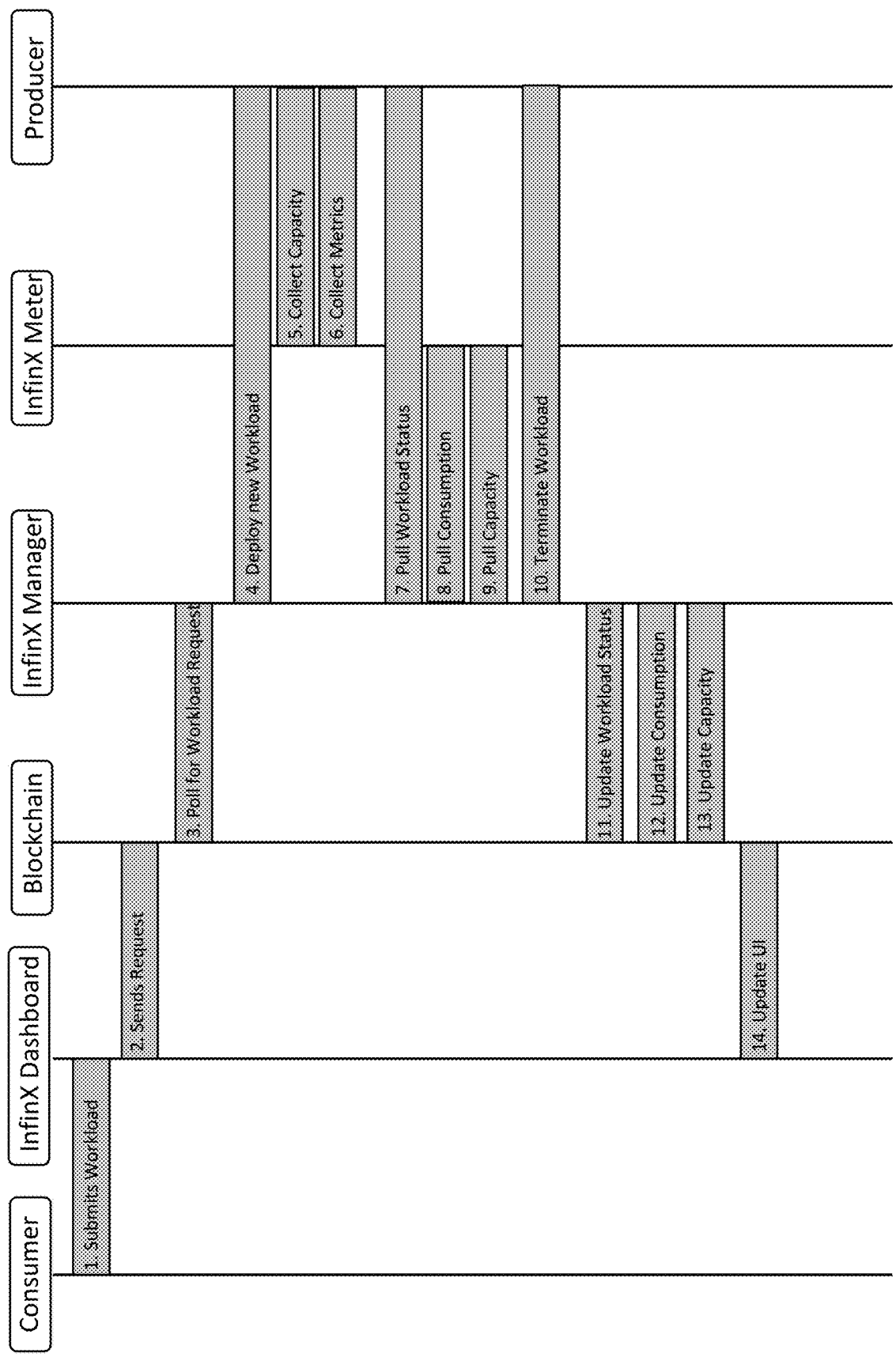
FIG. 19 illustrates a workflow process on the blockchain-based IT marketplace platform according to one embodiment of the present invention.

FIG. 19 illustrates a workflow process on the blockchain-based IT marketplace platform according to one embodiment of the present invention. A consumer submits a workload request via a platform interface dashboard. The platform interface dashboard sends the workload request to the platform blockchain. The platform blockchain polls manager modules for resources for workload requests. At least one manager module deploys the new workload to a producer. The smart meter for the producer collects capacity and metrics information from the producer. The manager module of the producer pulls/retrieves workload status from the producer, and capacity and consumption information from the smart meter. The manager module is operable to terminate workload if the consumption is beyond the capacity. Meanwhile, the manager module update workload status, consumption and capacity information to the platform blockchain. The platform blockchain updates the information in the user interface for the consumer.

Figure 20:
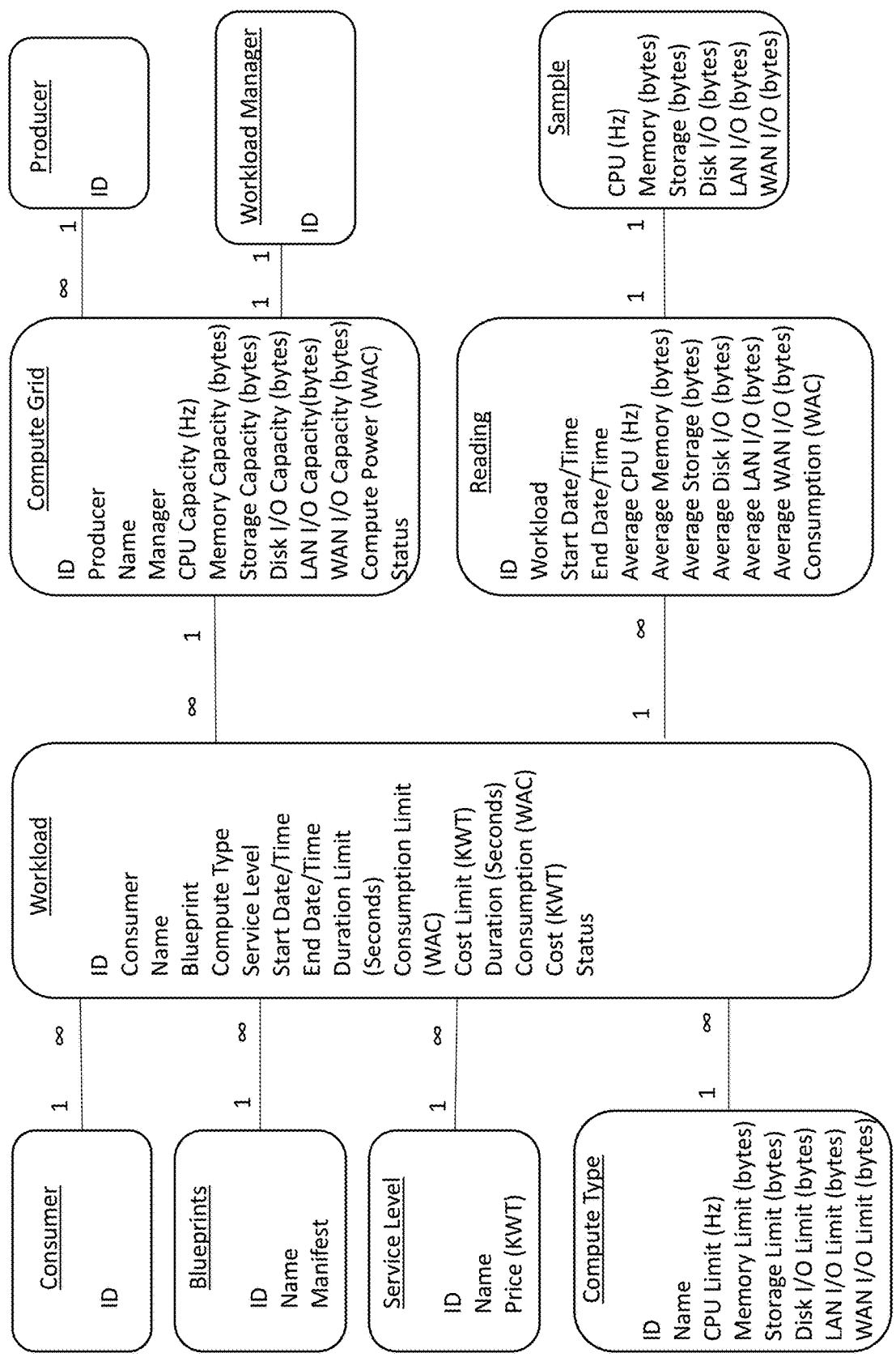
FIG. 20 illustrates data models for various data types on the blockchain-based marketplace platform according to one embodiment of the present invention.

FIG. 20 illustrates data models for various data types on the blockchain-based marketplace platform according to one embodiment of the present invention. Consumers and producers on the blockchain-based marketplace platform are defined by their unique identities (IDs). A workload request from a consumer includes compute types, blueprints and service level. Information for compute types includes ID, Name, CPU Limit (Hz), Memory Limit (Bytes), Storage Limit (Bytes), Disk I/O Limit (Bytes/sec), LAN I/O Limit (Bytes/sec) and WAN I/O Limit (Bytes/sec). The ID is a cryptographic ID, and the Name is the name of a workload which indicates jobs, batches, or applications for execution. Information for blueprints include ID, Name, and Manifest. Manifest is the digital pick sheet describing characteristics and qualitative filters for the consumer's workload. Information for service level includes ID, Name and Price (kWT).

Earing kWT Across the Blockchain-Based IT Marketplace Platform

Figure 21:
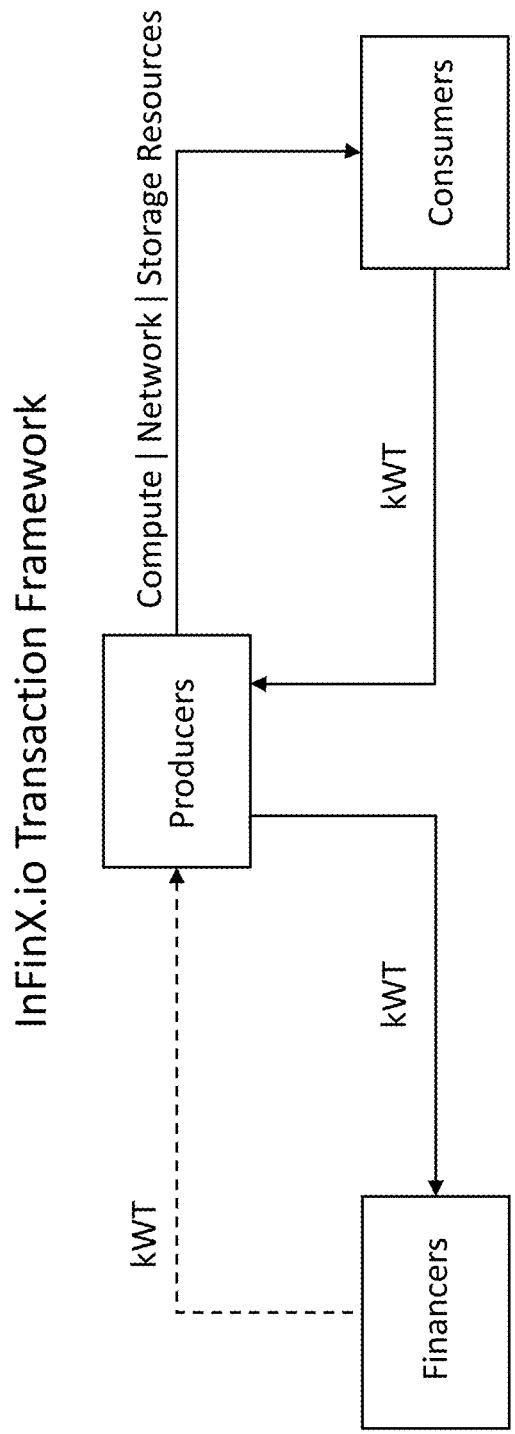
FIG. 21 illustrates a transaction framework on the blockchain-based IT marketplace platform according to one embodiment of the present invention.

The blockchain-based IT marketplace platform of the present invention provides incentives for producers and consumers to make transactions. FIG. 21 illustrates a transaction framework on the blockchain-based IT marketplace platform according to one embodiment of the present invention. In one embodiment, kWT can be earned in at least three possible ways: 1) by validating blocks in the PoS model; 2) by making available surplus capacity available for use by consumers; and 3) by directly financing producer infrastructure on a consumption-return basis.

1) Block Validation

Every smart meter on the blockchain-based marketplace platform acts as a PoS validator, which earns kWT for their corresponding producer. PoS can only happen when a meter operator puts up a stake, by locking up a certain amount of their coins, to verify a block of transactions. To prevent any concentration of block mining on the blockchain-based IT marketplace platform of the present invention, each producer has a minimum stake value and a maximum stake value, both of which are calculated based on real time supply and demand on the network.

Blocks are assigned to producers within this construct on the basis of available capacity and resources and lowest Gas price (in kWT). A producer with the greatest capacity and lowest Gas price at any one time will be assigned the next block. Meter operators that meet the conditions to validate blocks are awarded their fee upon the completion of the block, which is paid by the smart contract originator.

The calculation of Gas on the blockchain-based IT marketplace platform of the present invention is based on the principles of Ethereum. On the traditional Ethereum network, Gas is calculated using the formulaic approach of multiplying the total number of computational steps (as a representation of complexity) by a fixed rate of micro-ether units. The blockchain-based marketplace platform of the present invention uses the same well-established practice but settling in kWT rather than Ether.

2) Monetizing Surplus Capacity

The blockchain-based IT marketplace platform of the present invention enables the option for every producer on the blockchain-based IT marketplace platform of the present invention to monetize the excess capacity of its node grids, no matter if a node grid is privately owned hardware or even public cloud computing accounts. The proprietary smart meter is designed to understand at any one point in time exactly what the usable capacity is on a given producer node. Excess capacity is matched algorithmically to available supply with the requirements expressed in each Interface Workload Manifest received from a consumer.

One of the biggest challenges to federating heterogeneous resources across a decentralized network is how to prioritize available node grids from producers. The proprietary smart meter possesses the technical capability of interrogating real-time IT environments to assess not just tacit theoretical resource capacities, but dynamic capacity of each node on an available node grid. A dynamic capacity represents the actual available resources after considering all underlying bottlenecks and observable constraints. The dynamic capacity, by its nature, can change by the minute or the hour. Therefore, a producer with resource configuration optimization will naturally successfully earn kWT on the blockchain-based IT marketplace platform. In other words, the producer with the greatest surplus capacity on the blockchain-based IT marketplace platform has the highest chance to win the next consumer manifest.

Workloads are defined by requests created via the platform interface. Workload requests include the following items: Compute Type (Small, Medium, Large, Custom) including CPU (Hz), Memory (Bytes), Storage (Bytes), Disk I/O (Bytes/sec), LAN I/O (Bytes/sec), and WAN I/O (Bytes/sec); Blueprint including Container Images and Configuration; and Service Level (Basic, Standard, Premium). The service level contains all of the critical quantitative and qualitative characteristics of the consumer's workload request. The maximum amount of consumption is calculated in kWT to execute a defined workload for the duration specified.

Prior to the application of any rating algorithms, the blockchain-based IT marketplace platform of the present invention permits certain qualitative features to be specified by the consumer. These qualitative features help add a measure of control for the consumer to ensure more precise requirements matching. In one embodiment, the blockchain-based IT marketplace platform provides various qualitative filters for consumers to specify certain qualitative features.

In one embodiment, the various qualitative filters include a geolocation filter, which lists the available physical operating locations to execute a consumer's workload. In another embodiment, the geolocation filter is operable to list sub-regions of the available physical operating locations to execute the consumer's workload.

In one embodiment, the various qualitative filters also include a producer tier filter, which lists the type of producer tiers available in a selected geolocation. Different tier rates will be offered for review when selected. Once selected, a tier rate will be locked-in through the end of execution of a consumer's workload. In one embodiment, the smart meter measures producer performance in the supply at all times and keeps track of the following items including real-time dynamic capacity availability, time since last disconnection from the platform, total consumption record, and reservation impact as a percentage of dynamic capacity.

In one embodiment, the various qualitative filters also include a compliance type filter to list. The compliance type filter allows users to remain compliant with either internal or public regulations. For example, the compliance type filter ensures that software developers of a large U.S. corporation do not violate data export laws by contracting with a host producer operating in an embargoed country or jurisdiction.

In one embodiment, the blockchain-based IT market platform provides a producer lottery algorithm called Dynamic Index System (DIS) to ensure a fair and equitable distribution of consumer workloads. The DIS algorithm is applied among the pool of producers that meet the Manifest Qualitative Filter test. Producers are assigned a probability ranking based on the DIS table. Outside of the slight margin for increased probability the winner in the pool is selected through a verifiable random process.

The blockchain-based IT marketplace platform calculates a dynamic aggregate rating score for each active producer on the network based on four specific indexes. The four specific indexes include an Availability Index (AVLi), a Capacity Index (CAPi), a Usage Index (USEi), and an Impact Index (IMPi). Each of the four indexes uses specific data criteria and calculates the DIS score by using data percentile markers across the entire criteria data set.

The purpose of the DIS is to create surcharge capability for additional qualitative criteria that is inherent in the producer's node and specifically selected through filters by consumers. The surcharge is added to the measured consumption levels and calculated in kWT owed to the producer for executing the workload requested.

The Availability Index (AVLi) measures the available uptime in hours for a producer's capacity during each monthly cycle. The data is tracked every hour in a given month and is stored in a global availability table.

The Capacity Index (CAPi) measures the available usable capacity in kWAC/h for a producer node during each hourly cycle. The data is tracked every hour in a given month and is stored in a global capacity table.

The Usage Index (USEi) measuring the total consumption in kWAC/h for using a producer's capacity during each monthly cycle. The data is tracked every hour in a given month and is stored in a global usage table.

The Impact Index (IMPi) measures the impact from workload request reservations on how much is actually consumed by the final workload execution. Optimally it is best when the resulting workload consumption is equal or close to the full reservation level. However, when this is not the case, the gap can be tracked and recorded as an impact variance. The higher the impact variance is, the higher the producer benefit will score. The data is tracked every hour in a given month and is stored in a global impact table.

The active DIS score is based upon the previous "last full hour" of readings. The total score is a weighted aggregate of each of the individual index scores added together. The score is calculated as follows and is an amount that ranges from 0 to 1.

In one embodiment, the Availability Index Weight (AVLw) is 40%, the Capacity Index Weight (CAPw) is 30%, the Usage Index Weight (USEw) is 20%, and the Impact Index Weight (IMPw) is 10%, all of which are combined weighting 100%. Thus, the producer DIS score is calculated based on the equation below.

$$\text{Producer DIS} = ((AVLi)*(AVLw) + ((CAPi)*(CAPw)) + ((USEi)*(USEw)) + ((IMPi)*(IMPw))$$

The rating system of the present invention automatically ranks all activated producer nodes hourly. FIG. 22 is a table displaying the DIS calculation by service type. FIG. 23 is a table listing current producer node levels with percentile-based indexes.

Figure 26:
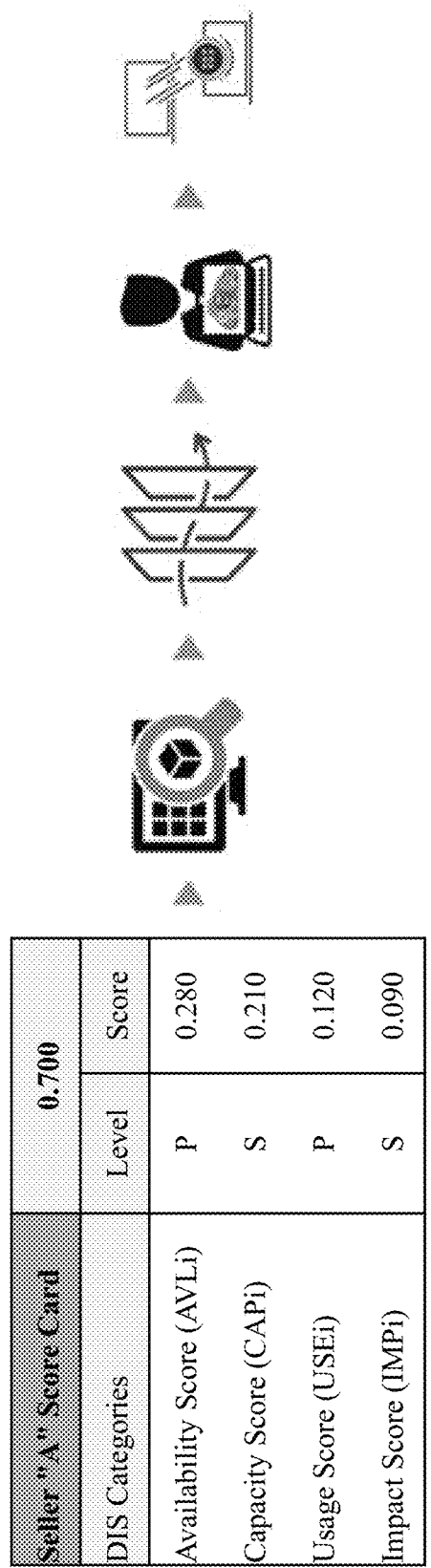
FIG. 26 illustrates a dynamic index system according to one embodiment of the present invention.
Figure 27:
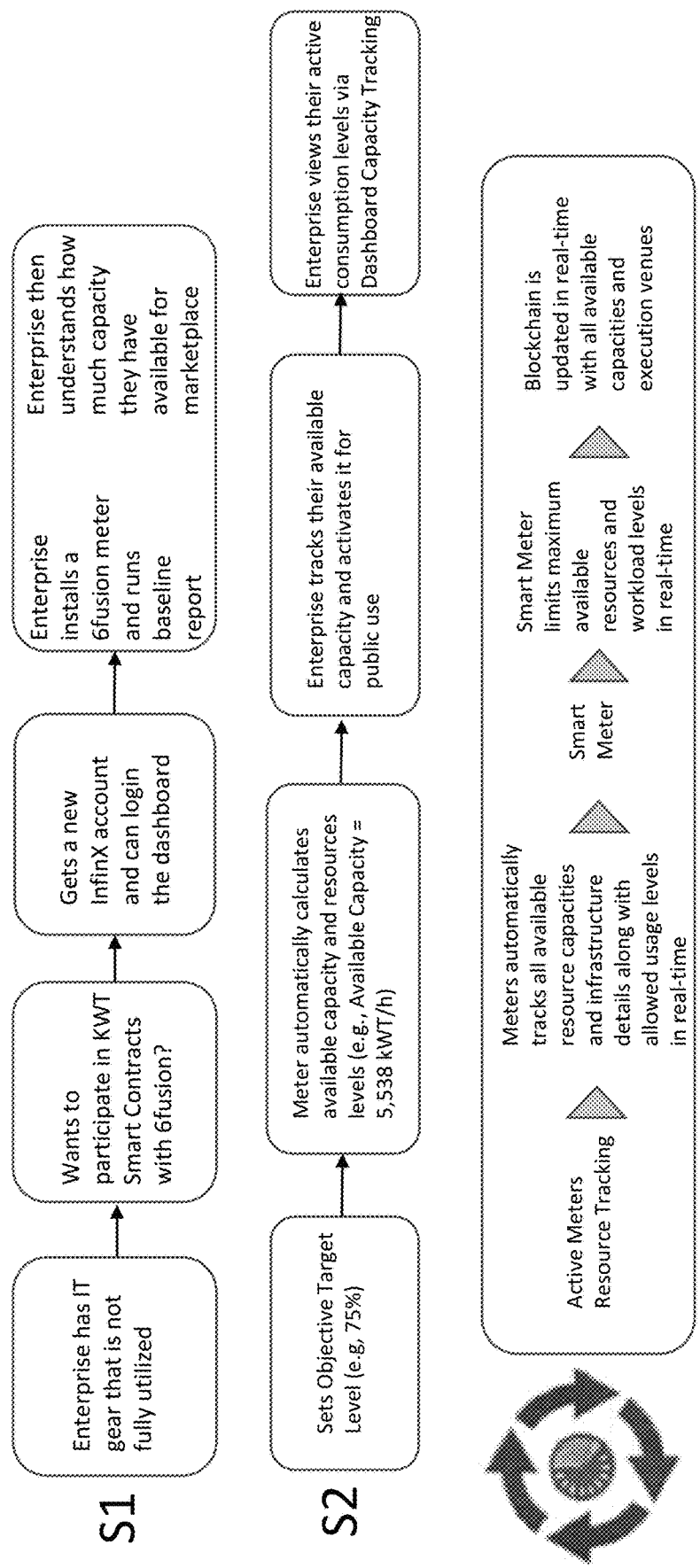
FIG. 27 illustrates a process of provisioning Producer Nodes according to one embodiment of the present invention.

The smart meter of the present invention continually benchmarks activated producer nodes and calculates a unique infrastructure rating score for each node. FIG. 24 displays the rating score calculation of a sample producer node Seller A. As infrastructure nodes fluctuates each hour, the infrastructure rating score is also updated to a running score card as shown in FIG. 25. Infrastructure ratings are available through filters when selecting execution venues as illustrated in FIG. 26. FIG. 27 illustrates a process of provisioning producer nodes according to one embodiment of the present invention.

3) Consumption Based Financing

The blockchain-based marketplace platform enables anyone to participate in crowdfunding events as financiers for IT infrastructure builds and expansions. In return, financiers receive a small percentage of returns as IT Infrastructure is consumed and paid for. In one embodiment, the financiers receive an agreed-upon rate in kWT for usage of the producer system financed by the financiers.

In one embodiment, the present invention provides a graphical user interface (GUI) for the blockchain-based marketplace platform. FIGS. 28-43 are screenshots of the GUIs according to one embodiment of the present invention.

Figure 28:
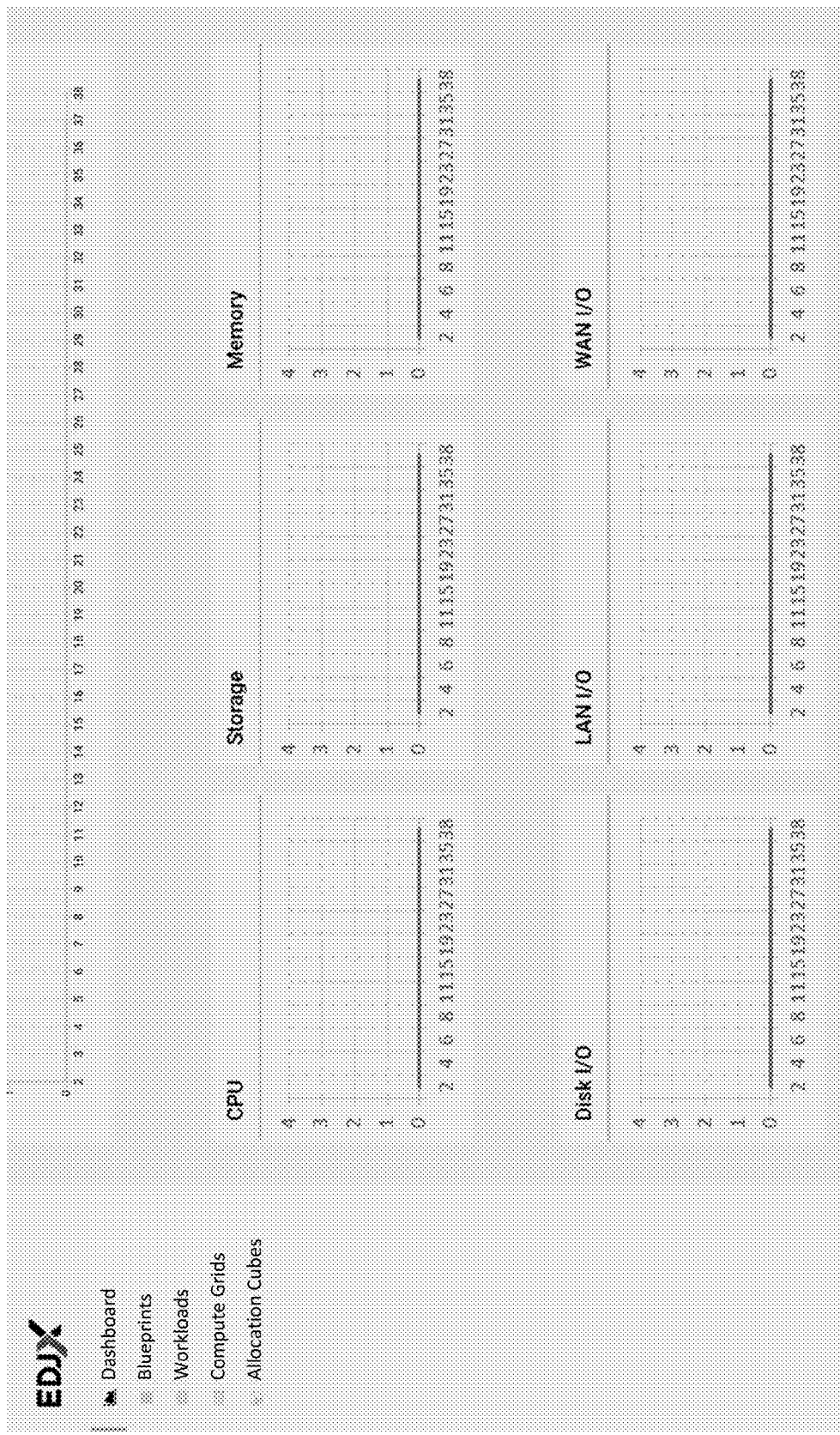
FIG. 28 is a screenshot of a dashboard tab in a GUI according to one embodiment of the present invention.
Figure 29:
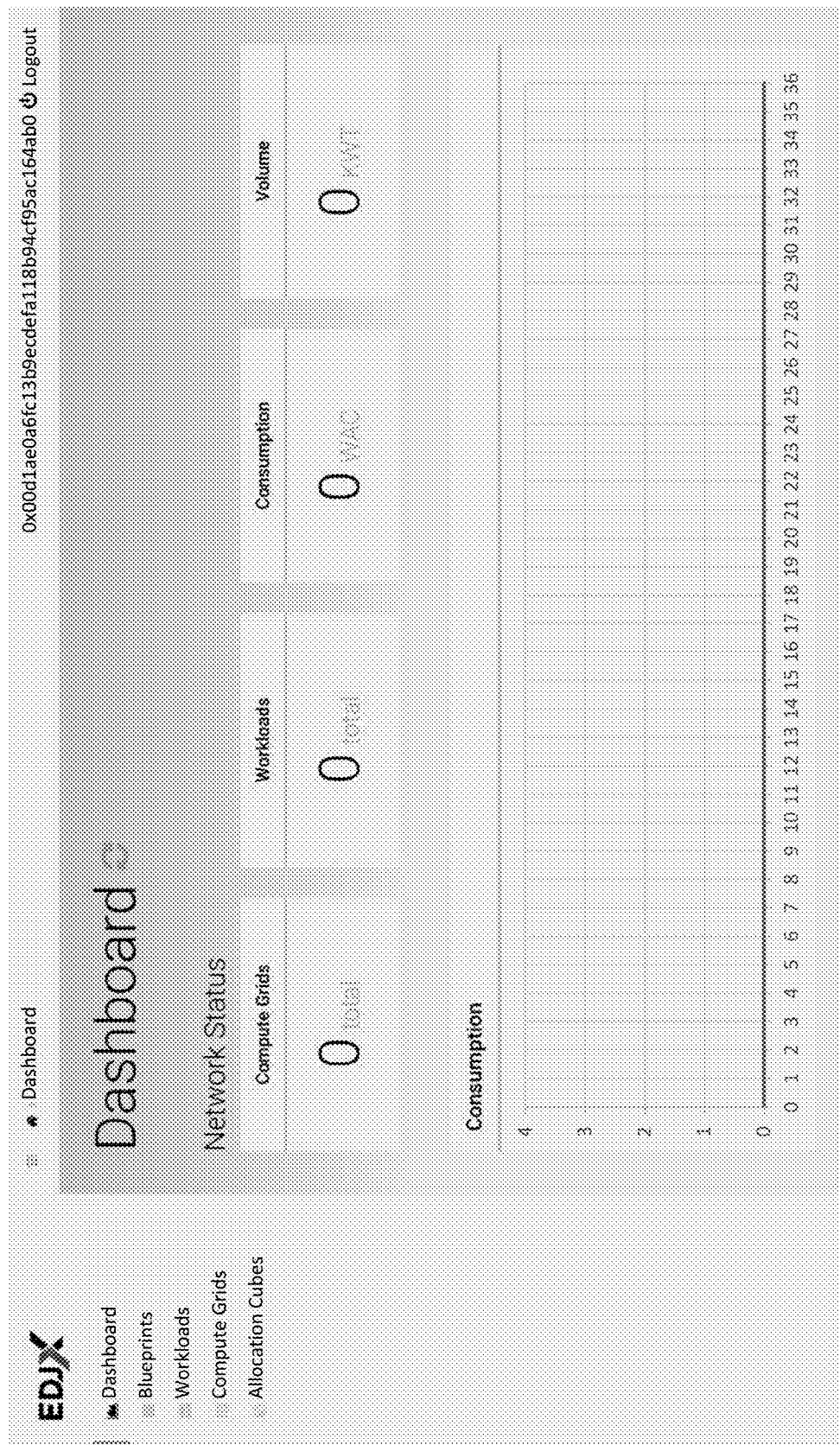
FIG. 29 is a screenshot of a dashboard tab in a GUI according to another embodiment of the present invention.

FIG. 28 is a screenshot of a dashboard tab in the GUI according to one embodiment of the present invention. The dashboard displays the information of the six metrics measuring compute resource usage in a graph respectively. FIG. 29 is a screenshot of a dashboard tab in the GUI according to another embodiment of the present invention. The network status indicates compute grids in total, workloads in total, consumption in WAC, and volume in kWT. The dashboard also displays consumption in graph.

Figure 30:
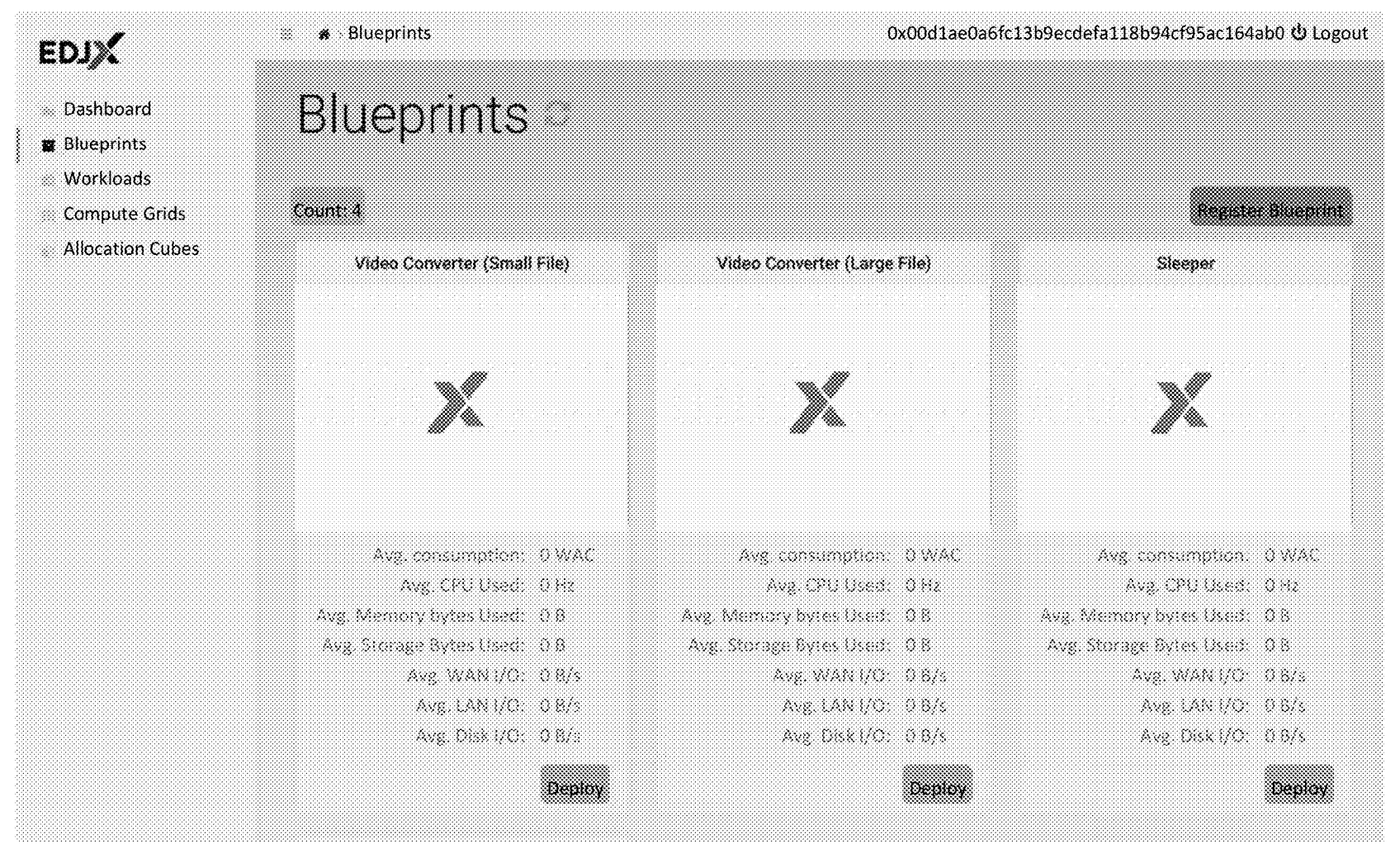
Figure 31:
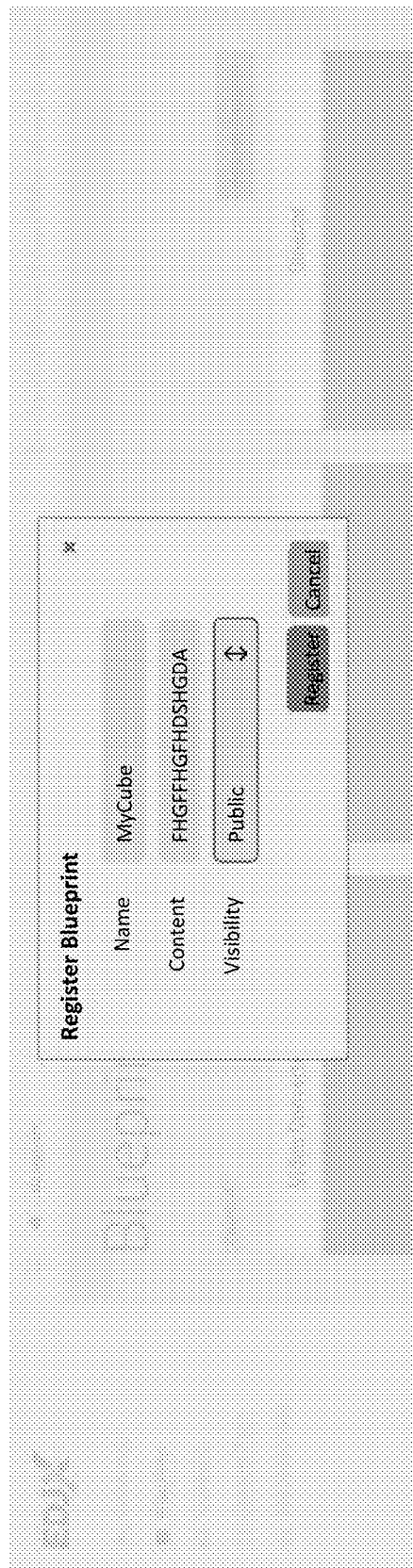
FIG. 31 is a screenshot of registering a blueprint with public visibility according to one embodiment of the present invention.
Figure 32:
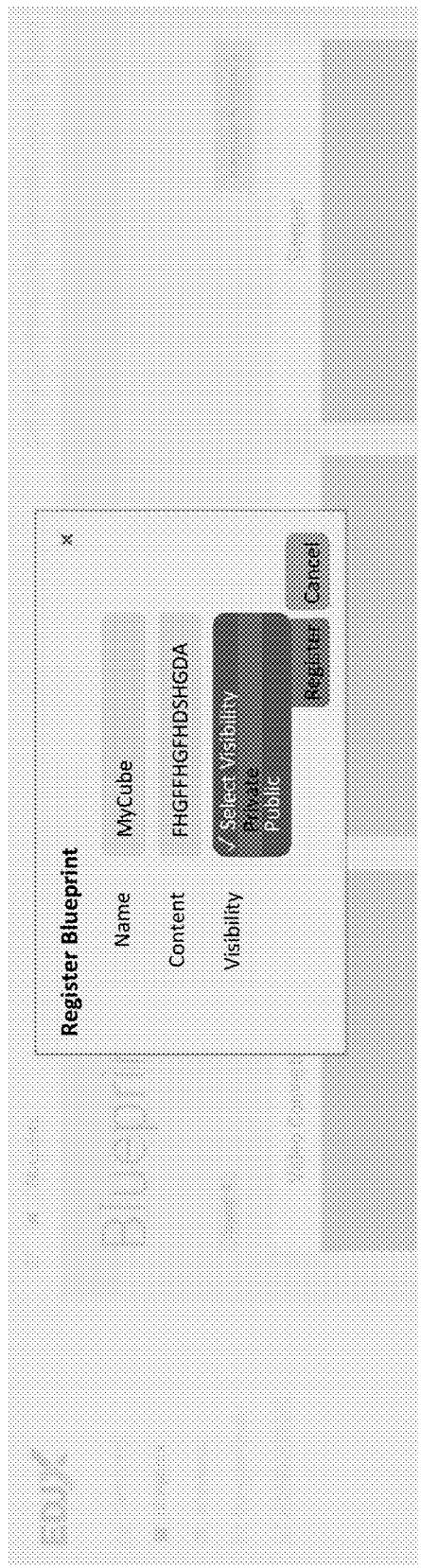
FIG. 32 is a screenshot of registering a blueprint with selectable visibility according to one embodiment of the present invention.

FIG. 30 is a screenshot of a blueprints tab in the GUI according to one embodiment of the present invention. FIG. 30 displays a video converter blueprint in a small file, a video converter blueprint in a large file, and a sleeper blueprint. FIG. 31 is a screenshot of registering a blueprint with public visibility according to one embodiment of the present invention. FIG. 32 is a screenshot of registering a blueprint with selectable visibility according to one embodiment of the present invention. the visibility can be set as private or public.

Figure 33:
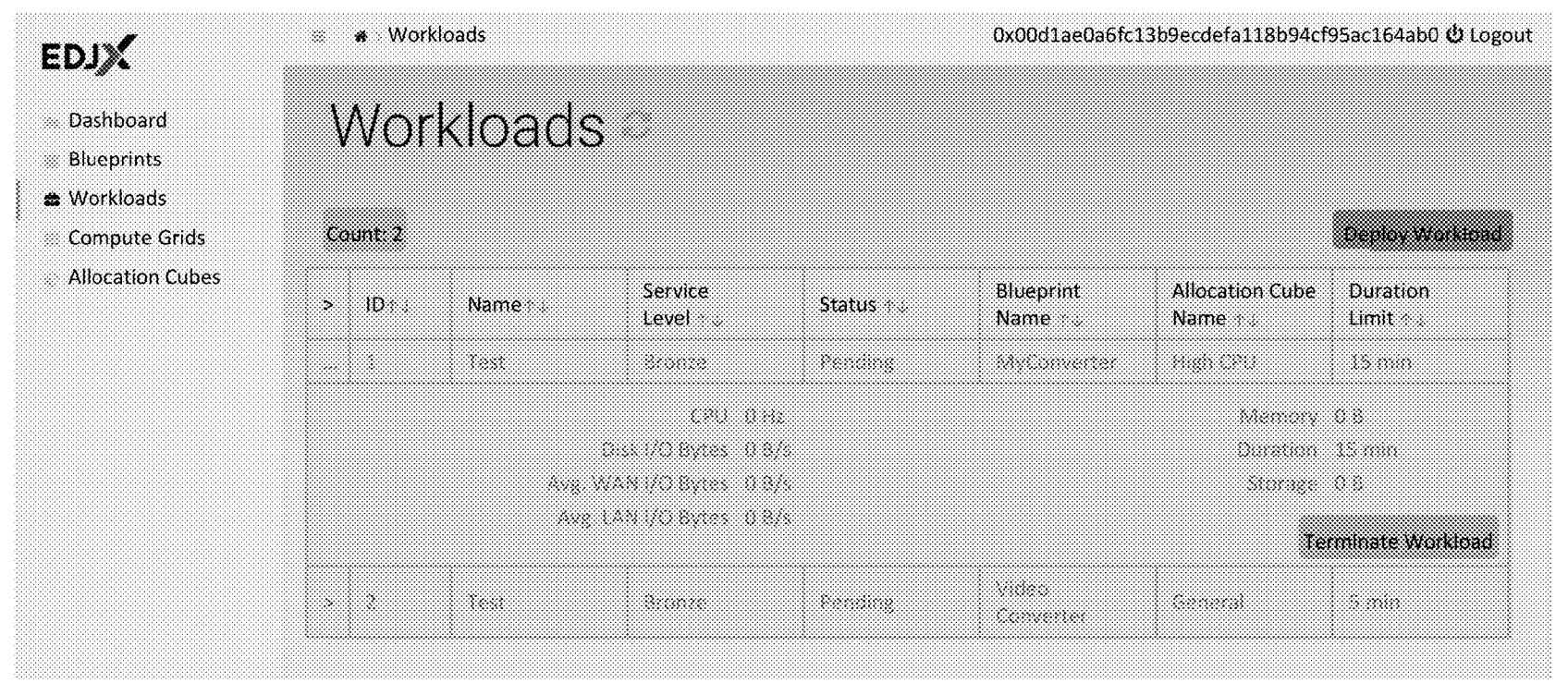
Figure 34:
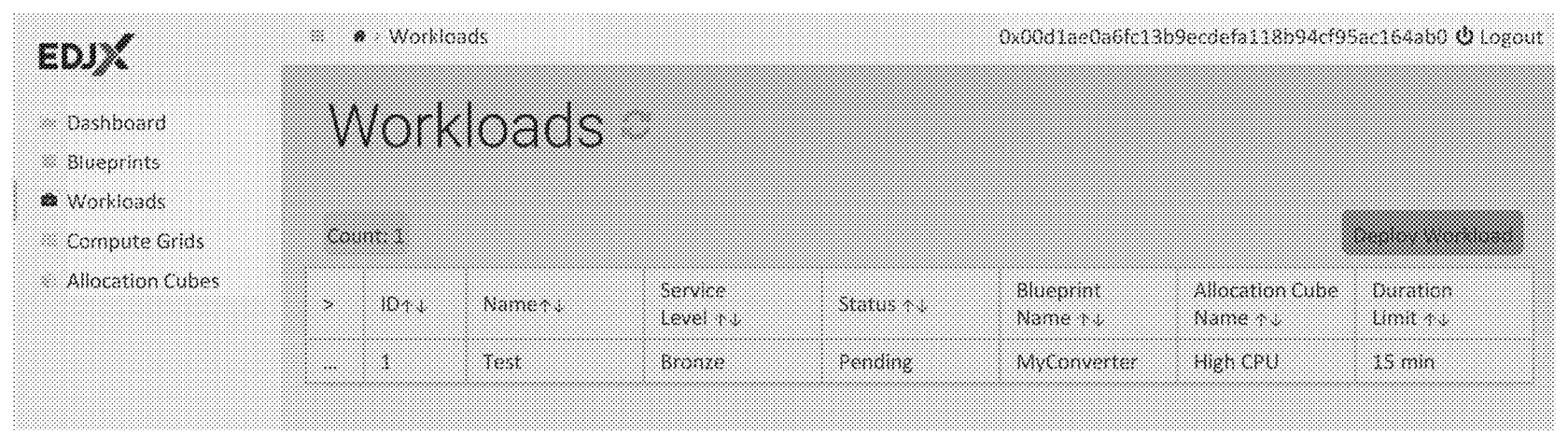

FIG. 33 is a screenshot of a workloads tab in the GUI according to one embodiment of the present invention. FIG. 34 is a screenshot of a workload tab in the GUI according to another embodiment of the present invention. a list of workloads is displayed with ID, name, service level, status, blueprint name, allocation cube name, and duration limit. A workload can be deployed and terminated.

Figure 35:
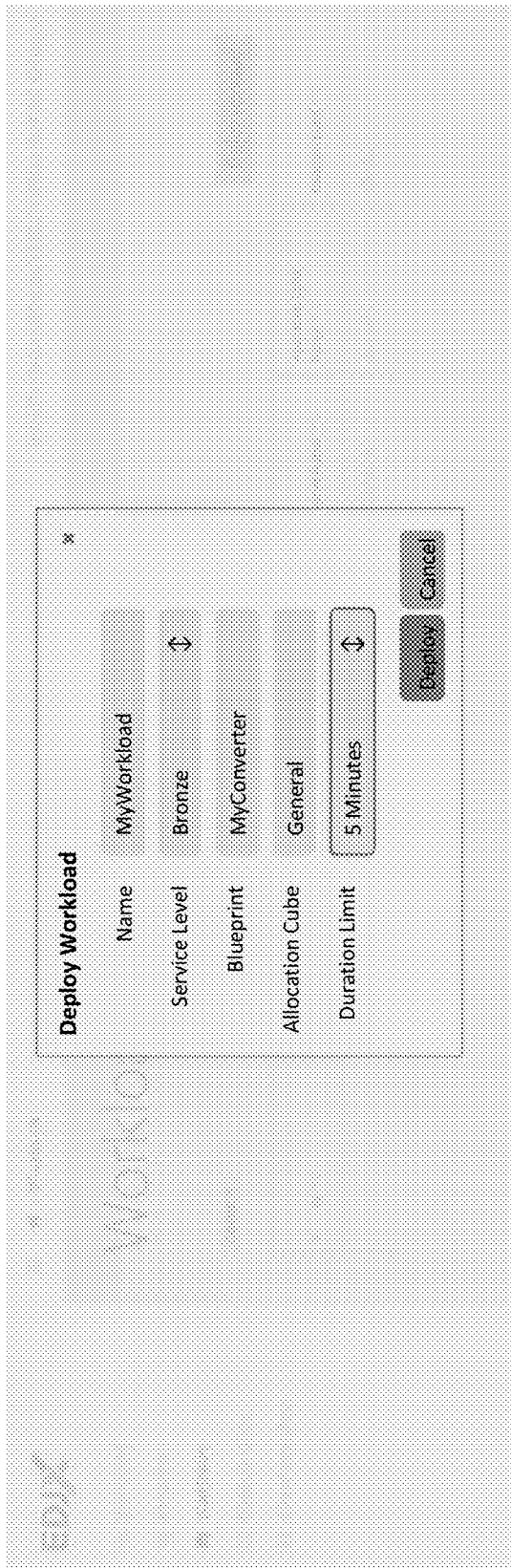
FIG. 35 is a screenshot of deploying a workload according to one embodiment of the present invention.
Figure 36:
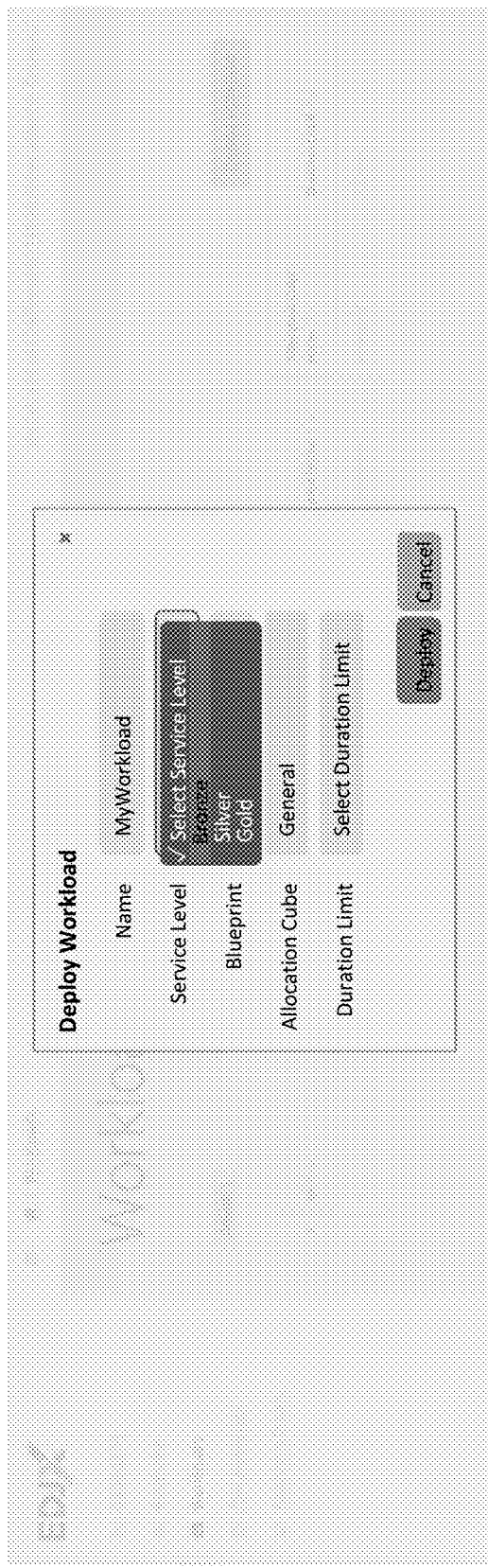
FIG. 36 is a screenshot of deploying a workload with selectable service levels according to one embodiment of the present invention.
Figure 37:
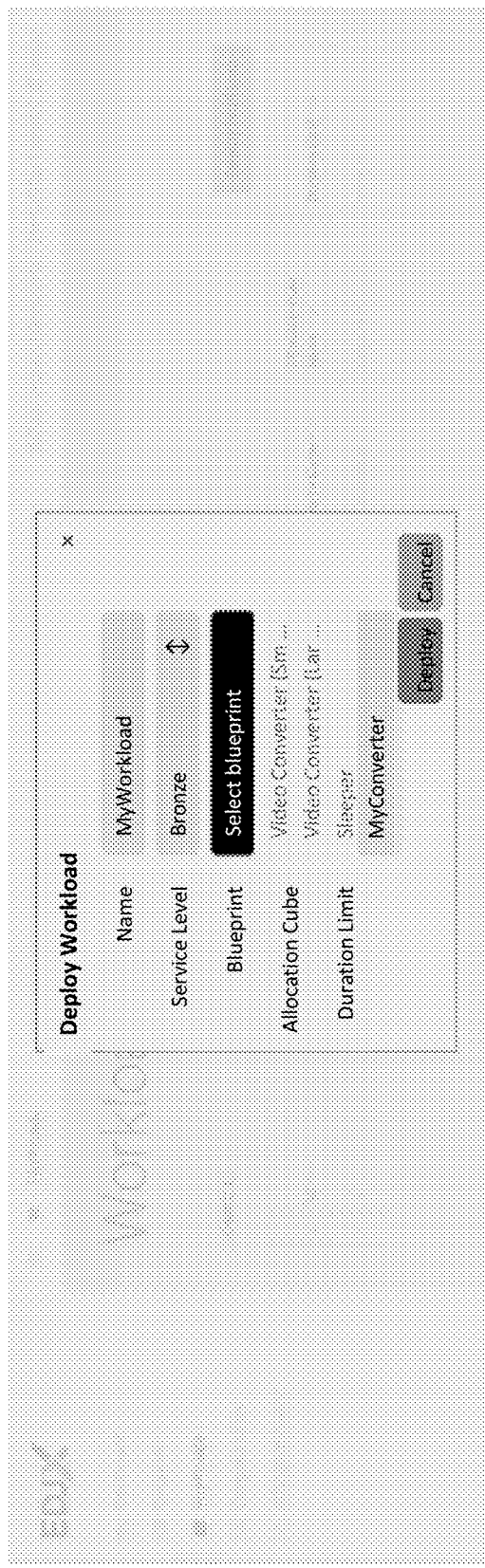
FIG. 37 is a screenshot of deploying a workload with selectable blueprints according to one embodiment of the present invention.
Figure 38:
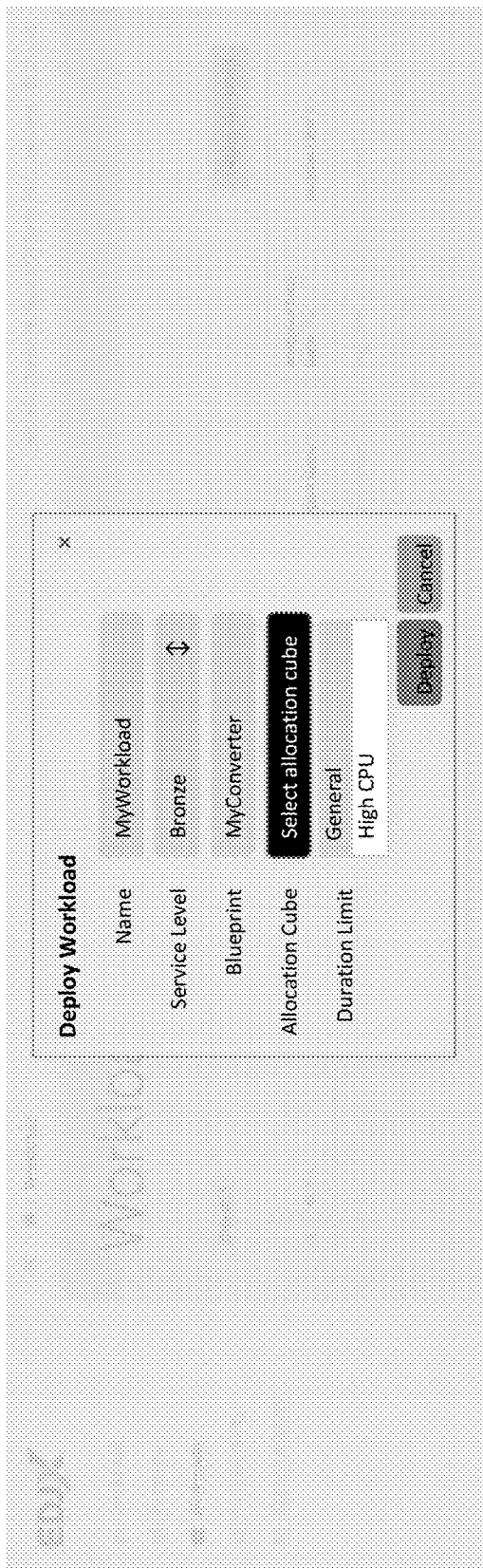
FIG. 38 is a screenshot of deploying a workload with selectable allocation cubes according to one embodiment of the present invention.
Figure 39:
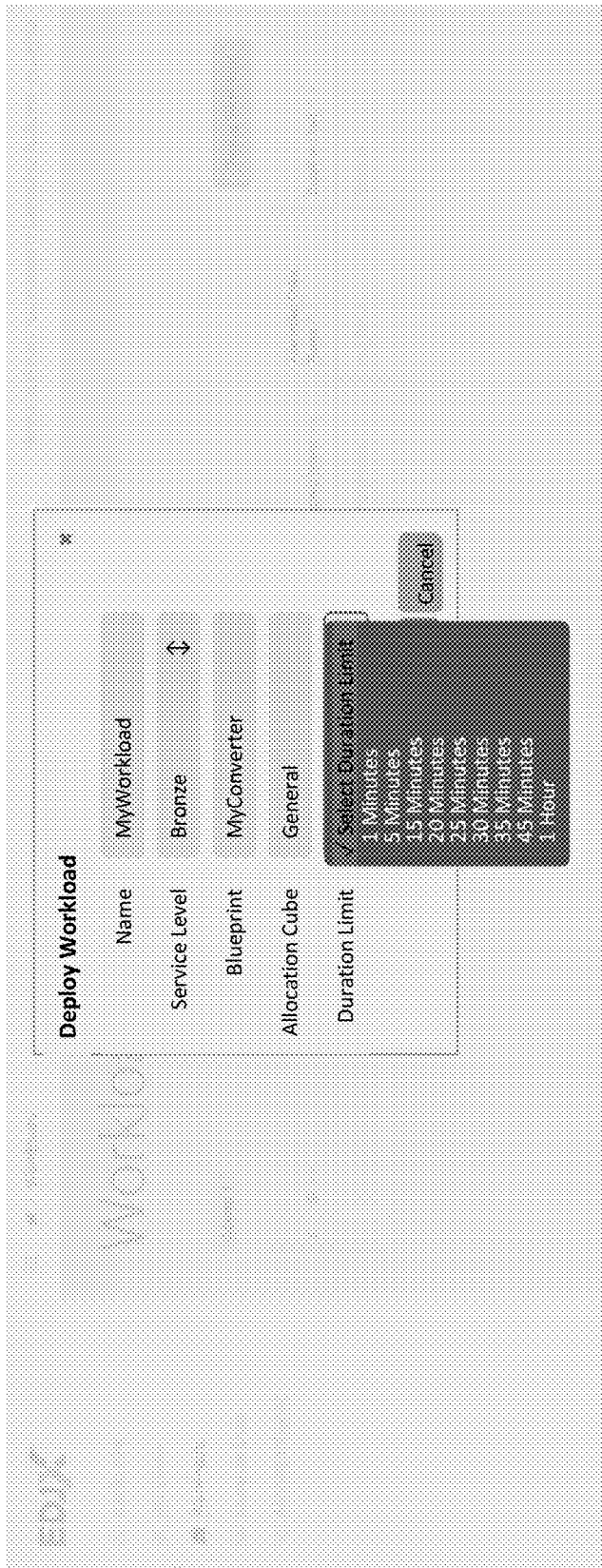
FIG. 39 is a screenshot of deploying a workload with selectable duration limits according to one embodiment of the present invention.

FIG. 35 is a screenshot of deploying a workload according to one embodiment of the present invention. FIG. 36 is a screenshot of deploying a workload with selectable service levels according to one embodiment of the present invention. FIG. 37 is a screenshot of deploying a workload with selectable blueprints according to one embodiment of the present invention. FIG. 38 is a screenshot of deploying a workload with selectable allocation cubes according to one embodiment of the present invention. FIG. 39 is a screenshot of deploying a workload with selectable duration limits according to one embodiment of the present invention.

Figure 40:
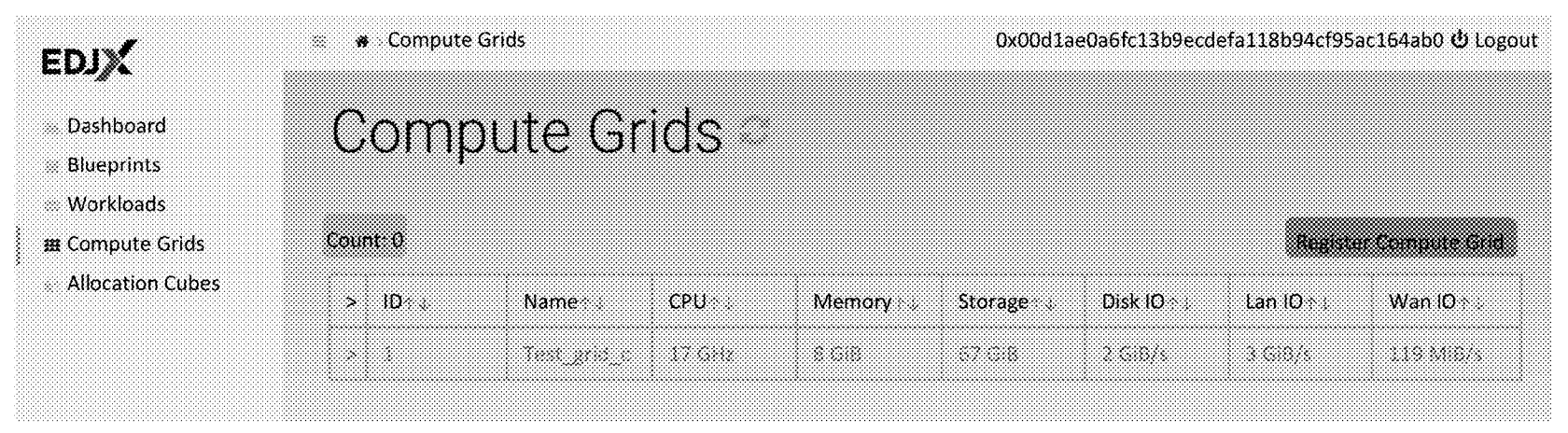
Figure 41:
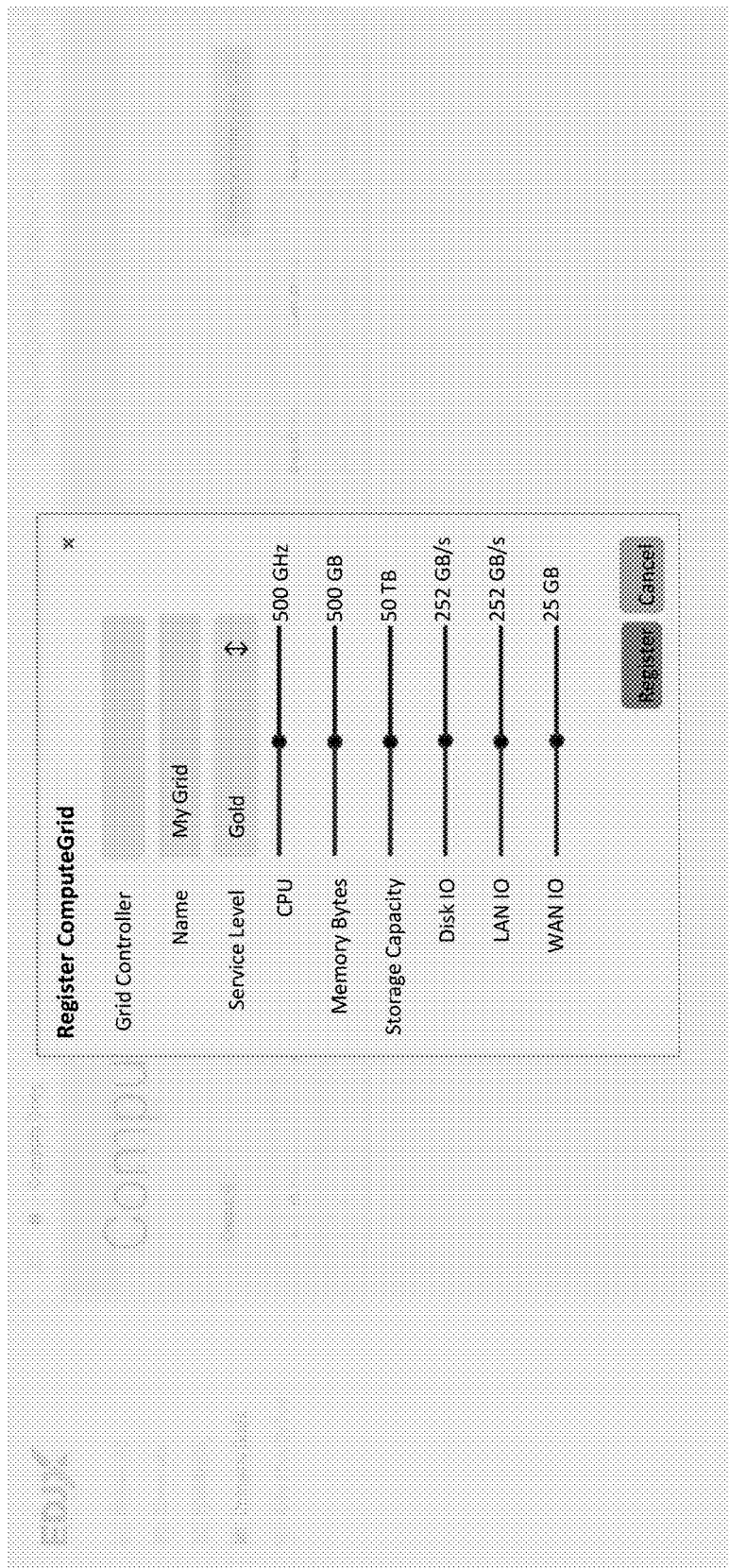
FIG. 41 is a screenshot of registering a compute grid according to one embodiment of the present invention.

FIG. 40 is a screenshot of a compute grids tab on the GUI according to one embodiment of the present invention. FIG. 41 is a screenshot of registering a compute grid according to one embodiment of the present invention. A compute grid is registered with a grid controller, a name, a service level, and adjustable CPU, Memory, Storage, Disk I/O, LAN I/O, and WAN I/O levels.

Figure 42:
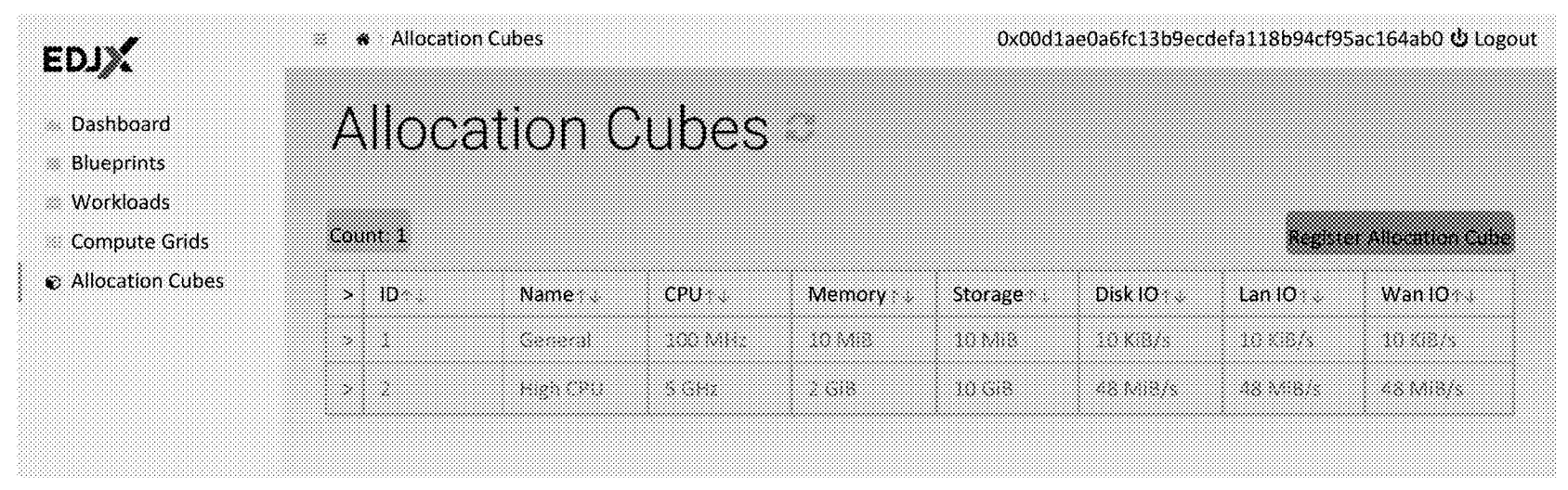
Figure 43:
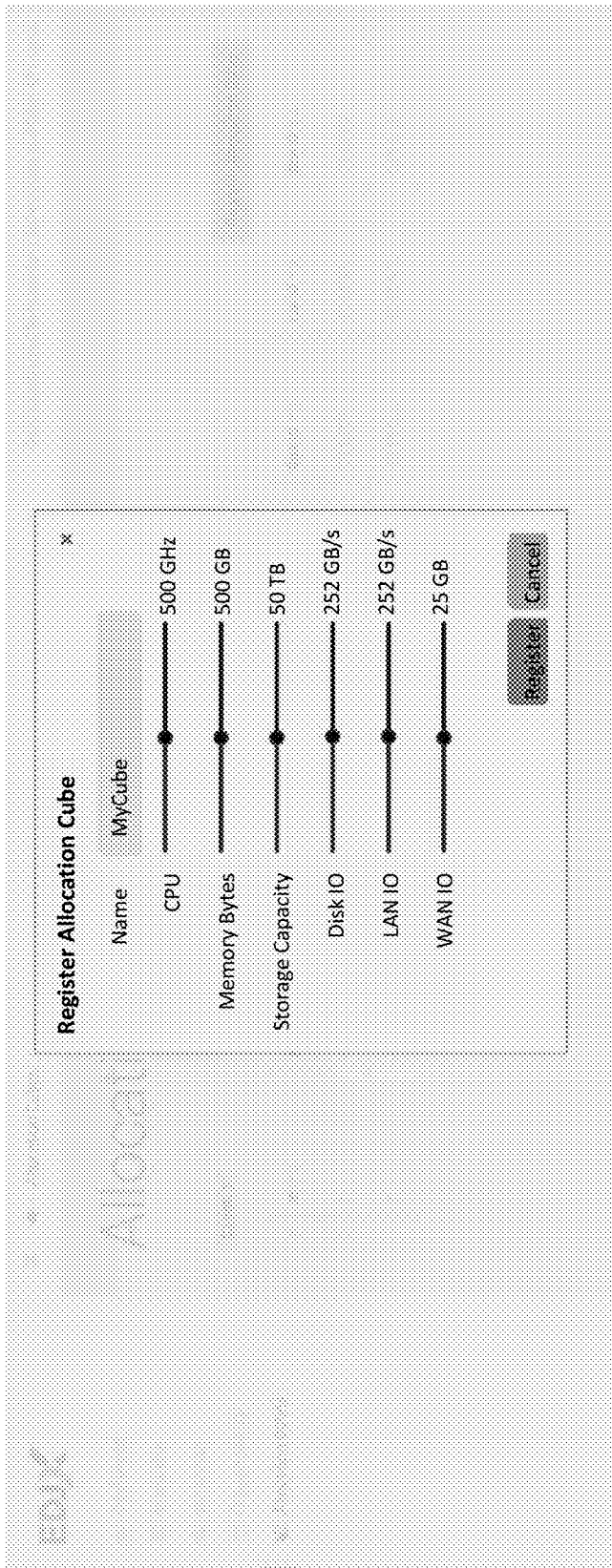
FIG. 43 is a screenshot of registering allocation cubes according to one embodiment of the present invention.

FIG. 42 is a screenshot of an allocation cubes tab in the GUI according to one embodiment of the present invention. FIG. 43 is a screenshot of registering allocation cubes according to one embodiment of the present invention. In one embodiment, an allocation cube is registered with a name, and adjustable CPU, Memory, Storage, Disk I/O, LAN I/O, and WAN I/O levels.

Benefits of the Blockchain-Based IT Marketplace Platform

The blockchain-based IT marketplace platform of the present invention dramatically reduced the total cost of ownership for producers. Any infrastructure operating a WAC-based smart meter has the power of surplus capacity selling. Connected to the blockchain-based IT marketplace platform, aggregate surplus capacity across the entire constellation of users forms a meshed Internet of compute, network and storage that can run any containerized workload on any platform. The blockchain-based IT marketplace platform of the present invention makes IT capacity purchase far cheaper than from public cloud providers. Any consumer on the blockchain-based IT marketplace platform, using only their cryptographic identity, is enabled to specify a workload request and manifest information such as resource capacity, qualitative filters, and container image locations to deploy any containerized application or function-as-a-service workload. The blockchain-based IT marketplace platform provides financiers less risk and more deals. The blockchain-based IT marketplace platform puts an end to infrastructure leasing capital expenditures for financiers by opening the financial market to anyone on the platform. Prospective financiers can participate in funding events for big enterprise data center builds and expansions, both return on investment and the time it takes to get financing transactions completed are improved.

Benefits to DevOps & IT Finance

Software development has been transformed by the advent of container technology. Unlike the concepts of predecessor technology like Virtual Machines, container technology allows developers to achieve a level of code portability and development simplicity never seen before.

Multi-cloud usage is a leading potential benefit to containerized application technologies, which would lessen public cloud lock-in by providing a software layer that can be developed in multiple host infrastructures. Freedom of choice and ease of use, as in any utility model, are potential advantages of cloud-native technology frameworks. However, the IT market lacks any salient options to track, monitor and compare the costs of these workload execution venues.

Two significant problems persist to hold the IT industry back from realizing maximum potential. First, the IT supply chain has yet to truly facilitate the velocity of workload creation and placement. Software Engineering and DevOps currently do not have a streamlined way to define, provision and consume IT resources across heterogeneous host environments with a harmonized billing and payment experience. This creates significant friction for enterprise IT financial administrations while further obscuring the financial transparency needed to make smart and measurable IT financial decisions. There is no standardized way to measure the true cost and financial efficiency of cloud native application services. And therein lies the second problem: in order to harness the sheer power of containerized applications, software engineering and DevOps are forced to limit deployment possibilities to monolithic internal IT services or a handful of contracted proprietary service providers, such as AWS, Google or Microsoft.

The blockchain-based marketplace platform of the present invention addresses the problems in IT operations and finance by providing DevOps with an open portal to a global network of available compute, memory, storage and network resources. The open portal enables a consumer with a unique account ID to specify a workload request and manifest information such as resource capacity, qualitative filers, and container image locations to deploy any containerized application service or function as a service via an interface. The blockchain-based IT marketplace platform enables a developer to execute code in common languages like JavaScript or Python.

Once deployed, workloads are executed by host producers and payment is settled using a standardized proxy value for consumption called WAC, which solves a universal standard problem for IT consumption measurement, thus reduces bloated IT financial administration. Moreover, the blockchain-based IT marketplace platform of the present invention requires no complex chargeback systems or cost allocation regimes, nor does it require any installation or set up. For DevOps, the blockchain-based IT marketplace platform alleviates the constraint of deployment possibilities by making an infinite number of possible hosts available with no cloud service provider accounts, installation burden or vendor lock-in concerns.

Benefits to IT BizOps

Enterprise IT administrators and operators face tremendous pressure to meet the needs of exponentially growing demands from engineering while balancing the fiscal discipline enforced by company finance. "Do more with less" is the order of the day for modern digital enterprise organizations seeking to squeeze more margin from their internet businesses. These diametrically opposing forces have produced an entire software industry called "IT Financial Management (ITFM)."

Vendors in this space prey on this "cost vs. demand" dynamic with promises to help IT and finance leaders manage, plan and optimize their technology investments across on-premises and cloud resources. However, customers have to pay millions of dollars for licensing, consulting and support fees.

In fact, the "cost-demand" dynamic is a function of IT financial efficiency more than that of IT financial management. Further, the greatest source of IT cost is surplus, not spend. IT is a perishable commodity in that yesterday's unused resources cannot be recovered today. The principal cause of surplus is the volatile nature of software and the fixed nature of IT infrastructure. That is, cloud native applications consume highly variable amounts of IT resources, yet IT operations and finance are forced to buy fixed capacity for peak usage just like power companies. This applies even to cloud instances like AWS, which are nothing more than smaller format virtual machines.

On one hand, IT financial efficiency can be rationalized by the proprietary WAC standard expression of capacity and consumption in lieu of overpriced ITFM software system. On the other hand, the blockchain-based IT marketplace platform of the present invention provides a scalable enterprise-ready solution to monetize surplus capacity. The blockchain-based IT marketplace platform enables enterprises to share and monetize the massive available compute, memory, storage, and network surplus. The blockchain-based IT marketplace platform provides near-universal pluggability for containerized applications. Any infrastructure operating an WAC-based smart meter are enabled with the functionality of both the blockchain validator services and surplus capacity selling.

The blockchain-based IT marketplace platform provides the first and only Enterprise IT solution that satisfies the needs of both engineering and finance by achieving supply and demand equilibrium. There is no more need for bloated and costly ITFM software regimes. Connected to the blockchain-based IT marketplace platform, aggregate surplus capacity across the entire constellation of users forms a meshed internet of compute, memory, storage, and network that can run any containerized workload on any platform.

Benefits to IT Procurement

While the idea of "internet of compute" promises to stitch together global computing and storage resources, it lacks a standardized system to measure and price capacity and consumption. The standard system does not just mean defining how consumers pay producers, it also means how the bare metal hardware infrastructure that powers the digital economy is financed.

Enterprise consumers of IT assets currently have only two choices, both of which are not compatible in the era of IT utility. One option is to simply pay out of pocket. The second is to arrange a straight-line lease or loan structure, paying a fixed monthly principal plus interest payment to the bank or outsourced managed service provider. Current financing mechanisms make it impossible for consumers to achieve financial equilibrium, which further propagates the problem of surplus capacity.

The shift in enterprise IT procurement driven by the advent of cloud computing technologies was characterized as "Bi-Modal IT", which became the mantra for embracing and harnessing a dual approach to IT procurement and operations strategy. Mode 1 focuses on predictability and has a goal of stability. This is the best way to characterize legacy IT, where requirements are well-understood and governance is well-established and regimented. Mode 2 is the opposite of Mode 1, where a lack of data and knowledge about the environment literally makes it impossible to plan and control (e.g., "shadow IT"). As the evolution of Bi-Modal IT continues, facing challenges in Mode 2 implementation and increasing pressure from cloud-based alternatives, Mode 1 IT buying behavior is evolving to seek more favorable comparisons to cloud-based implementations, which is called Mode 1.5 buying behavior. For example, the IT procurement market is shifting toward "consumption-like" procurement alternatives for IT assets as data can "facilitate favorable comparisons to cloud-based alternatives when end users need to provide justification for implementing their own data center solutions."

The blockchain-based IT marketplace platform of the present invention provides a Financial Transaction Dashboard, where anyone can participate in crowdfunding events for IT procurement. In return, financiers receive a small percentage of returns as Apps and Infrastructure are consumed and paid for. All transactions are settled on the blockchain-based IT marketplace platform of the present invention.

The blockchain-based IT marketplace platform of the present invention puts an end to infrastructure leasing capex by opening the financial market to anyone on the blockchain-based marketplace platform. Prospective financiers can participate in funding events for big enterprise data center builds and expansions, improving the return on investment and reducing the time it takes to get financing transactions operational.

Benefits to Cloud Native ISVs

The term "Cloud Native" refers to an architectural model that applies to software and infrastructure that is developed purposefully for the inherent elasticity of shared multi-tenant environments characteristic of cloud computing. In recent years, Independent Software Vendor (ISV) communities have emerged as the foundation for the cloud native application community.

The enterprise software market is moving along toward a state of utility similar to what hardware infrastructure does. Legacy, monolithic licensing models are being harshly challenged by big consumers in the market. And the ISVs in the supply chain are struggling to cope with the pressure for "pay what I consume" software. The nature of containerized cloud native software makes is too difficult to track what has been consumed that the only plausible licensing model for software is archaic trust and audit models.

The blockchain-based IT marketplace platform of the present invention provides the next generation commercial path for cloud native software using consumption-based licensing. The standardized WAC metric applied to hardware infrastructure serves also as a perfect proxy for software consumption. The blueprint library on the blockchain-based marketplace platform of the present invention is a private/public store available to consumers and producers to pull and deploy any certified ISV containers. Consumption is tracked daily on the platform blockchain and settlement between consumer and ISV is fast and auditless.

The blockchain-based IT marketplace platform creates unprecedented financial opportunities by opening and democratizing the IT supply chain. However, the blockchain-based IT marketplace platform is not limited to IT supply chain, it is applicable to many different industries including data center real estate, renewable energy, global wide area networking, managed services, and software licensing. The platform of the present invention is rooted in open participation and community development. In one embodiment, the present invention provides a royalty-free license and open source API enabling custom development and integrations.

The present invention solves technical problems associated with IT supply chain management by providing solutions for buying, selling, and financing enterprise IT infrastructure capacity on a decentralized and distributed marketplace platform. Notably, the present invention provides solutions to IT supply chain management which utilize distributed ledger technology and/or the blockchain; these solutions are inextricably tied to computer technology. Additionally, the concept of IT supply chain management is specific to computer networks and computing technology. Thus, any improvements to IT supply chain management are necessarily inextricably tied to computer technology. The solutions provided by the present invention are not well-understood, routine, or conventional.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The claims are amended as follows:

1. A system for distributed information technology (IT) resource transactions, comprising:
   at least one consumer computer and at least one producer node in network communication with a distributed IT marketplace platform;
   wherein each of the at least one producer node comprises a workload manager module and an IT meter;
   wherein the at least one consumer computer is operable to submit a workload request to the distributed IT marketplace platform;
   wherein the distributed IT marketplace platform is operable to poll information from the workload manager module at each of the at least one producer node regarding the workload request;
   wherein the information from the workload manager module includes dynamic surplus capacity information;
   wherein the workload manager module is operable to deploy a workload to a corresponding producer node;
   wherein the IT meter is operable to collect capacity and metrics information from the at least one producer node; and
   wherein the distributed IT marketplace platform is operable to settle the IT resource transactions between the at least one consumer computer and the at least one producer node based on the information from the workload manager module.

2. The system of claim 1, wherein the workload manager module is further operable to retrieve the workload status, the consumption information, and the capacity information from the IT meter, and send an updated workload status, updated consumption information, and updated capacity information to the distributed IT marketplace platform.

3. The system of claim 1, wherein the IT meter is based on a Workload Allocation Cube (WAC) algorithm measuring six IT resources including processing power, memory, storage, Disk Input/Output (I/O), Local Area Network (LAN) I/O, and Wide Area Network (WAN) I/O.

4. The system of claim 3, wherein the at least one producer node has dynamic capacity representing the maximum available capacity after all combined workloads have exhausted one of the six IT resources to 100%.

5. The system of claim 1, wherein the workload request comprises compute types, blueprints, and a service level.

6. The system of claim 1, wherein the distributed IT marketplace platform is a blockchain-based IT marketplace platform.

7. The system of claim 1, wherein the distributed IT marketplace platform comprises a geolocation filter listing available physical operating locations to execute the workload.

8. The system of claim 1, wherein the distributed IT marketplace platform comprises a producer tier filter listing types of producer tiers available in a selected geolocation.

9. The system of claim 1, wherein the distributed IT marketplace platform comprises a compliance type filter.

10. The system of claim 1, wherein the distributed IT marketplace platform is further operable to calculate a dynamic aggregate rating score for each of the at least one producer node based on an availability index, a capacity index, a usage index, and an impact index.

11. The system of claim 10, wherein the dynamic aggregate rating score is a weighted aggregate of the availability index, the capacity index, the usage index, and the impact index with corresponding weighting factors.

12. The system of claim 1, further comprising at least one financer computer in network communication with the distributed IT marketplace platform, wherein the at least one producer node is operable to send a financing request to the distributed IT marketplace platform, wherein the at least one financer computer is operable to provide finance for IT infrastructure of the at least one producer node via the distributed IT marketplace platform, and wherein the at least one financer computer is operable to receive compensation for financing the IT infrastructure of the at least one producer node.

13. A system for distributed information technology (IT) resource transactions, comprising:
   a multiplicity of consumer computers and a multiplicity of producer nodes in network communication with a blockchain-based IT marketplace platform;
   wherein each of the multiplicity of producer nodes comprises a workload manager module and an IT meter;
   wherein the multiplicity of consumer computers is operable to submit a workload request to the blockchain-based IT marketplace platform;
   wherein the blockchain-based IT marketplace platform is operable to poll information from the workload manager module at each of the multiplicity of producer nodes regarding the workload request;
   wherein the information from the workload manager module includes dynamic surplus capacity information;
   wherein the workload manager module is operable to deploy a workload to a corresponding producer node;
   wherein the IT meter is operable to collect capacity and metrics information from the multiplicity of producer nodes; and
   wherein the blockchain-based IT marketplace platform is operable to settle the IT resource transactions between the multiplicity of consumer computers and the multiplicity of producer nodes based on the information from the workload manager module.

14. The system of claim 13, wherein the blockchain-based IT marketplace platform is operable to provide an escrow account to facilitate the IT resource transactions.

15. The system of claim 13, wherein the IT meter is operable to continuously monitor the blockchain-based IT marketplace platform for workload requests.

16. The system of claim 13, wherein the blockchain-based IT marketplace platform is operable to deploy a smart contract between one or more of the multiplicity of consumer computers and one or more of the multiplicity of producer nodes.

17. The system of claim 13, wherein the IT resource transactions are executed with cryptocurrency created on the blockchain-based IT marketplace platform.

18. The system of claim 13, wherein the blockchain-based IT marketplace platform is based on Istanbul Byzantine Fault Tolerant (IBFT) consensus protocol.

19. A method for distributed information technology (IT) resource transactions, comprising:
- providing a distributed IT marketplace platform, wherein at least one consumer computer and at least one producer node are in network communication with the distributed IT marketplace platform, wherein each of the at least one producer node comprises a workload manager module and an IT meter;
- the at least one consumer computer submitting a workload request to the distributed IT marketplace platform;
- the distributed IT marketplace platform polling information from the workload manager module at each of the at least one producer node regarding the workload request, wherein the information from the workload manager module including dynamic surplus capacity information;
- one or more of the at least one workload manager module deploying a workload to corresponding one or more producer nodes based on the workload request;
- one or more IT meters collecting capacity and metrics information from the corresponding one or more producer nodes; and
- the distributed IT marketplace platform settling the IT resource transactions between the at least one consumer computer and the at least one producer node based on the information from the workload manager module.

20. The method of claim 19, further comprising the one or more of the at least one workload manager module terminating the workload when consumption is beyond a capacity of the corresponding one or more producer nodes.

* * * * *